(12) United States Patent
Moh et al.

(10) Patent No.: US 12,024,656 B2
(45) Date of Patent: Jul. 2, 2024

(54) MOULDED BODY COMPRISING A STRUCTURED SURFACE FOR CONTROLLED ADHESION

(71) Applicant: INNOCISE GmbH, Saarbrücken (DE)

(72) Inventors: Karsten Moh, Blieskastel-Brenschelbach (DE); Lena Barnefske, Frankfurt (DE); Eduard Arzt, Saarbrücken (DE); Fabian Rundel, Saarbrücken (DE)

(73) Assignee: INNOCISE GMBH, Saarbrücken (DE)

( * ) Notice: Subject to any disclaimer, the term of this patent is extended or adjusted under 35 U.S.C. 154(b) by 0 days.

(21) Appl. No.: 17/916,825

(22) PCT Filed: Apr. 7, 2021

(86) PCT No.: PCT/EP2021/059002
§ 371 (c)(1),
(2) Date: Oct. 4, 2022

(87) PCT Pub. No.: WO2021/204840
PCT Pub. Date: Oct. 14, 2021

(65) Prior Publication Data
US 2023/0151247 A1    May 18, 2023

(30) Foreign Application Priority Data
Apr. 9, 2020  (DE) .................. 10 2020 109 939.8

(51) Int. Cl.
*C09J 7/00*    (2018.01)
(52) U.S. Cl.
CPC ............ *C09J 7/00* (2013.01); *C09J 2301/31* (2020.08)

(58) Field of Classification Search
None
See application file for complete search history.

(56) References Cited

U.S. PATENT DOCUMENTS

| 8,839,495 B2 | 9/2014 | Tuma |
| 9,072,345 B2 | 7/2015 | Tuma |

(Continued)

FOREIGN PATENT DOCUMENTS

| WO | 9940812 A | 8/1999 | |
| WO | WO-03087458 A1 * | 10/2003 | ......... A47G 27/0293 |

(Continued)

OTHER PUBLICATIONS

English Abstract for WO2012013290, Feb. 2, 2012.

(Continued)

*Primary Examiner* — Frank J Vineis
*Assistant Examiner* — Nicole T Gugliotta
(74) *Attorney, Agent, or Firm* — CAHN & SAMUELS, LLP

(57) ABSTRACT

A moulded body includes a structured surface, wherein the surface has a structuring including a plurality of protrusions (pillars), at least each having a stem and comprising an end face pointing away from the surface. With this end face, the protrusions come into contact with the surface of the adhered object, wherein at least one protrusion comprises at least one structural feature, which, when loading the protrusion, leads to a directed deformation of the protrusion by changing the adhesion.

13 Claims, 39 Drawing Sheets

(56) References Cited

U.S. PATENT DOCUMENTS

| | | |
|---|---|---|
| 11,359,658 B2 | 6/2022 | Kroner et al. |
| 2005/0271869 A1* | 12/2005 | Jackson .................. B32B 27/12 |
| | | 428/297.4 |
| 2010/0215543 A1 | 8/2010 | Henry et al. |
| 2011/0117321 A1 | 5/2011 | Menon et al. |
| 2013/0125353 A1* | 5/2013 | Tuma ...................... B81B 1/008 |
| | | 24/442 |
| 2016/0296045 A1* | 10/2016 | Frumkin ................... C09J 7/00 |
| 2018/0264657 A1 | 9/2018 | Dadkhah Tehrani et al. |
| 2021/0062839 A1 | 3/2021 | Arzt et al. |
| 2021/0071045 A1 | 3/2021 | Arzt et al. |
| 2021/0071046 A1 | 3/2021 | Arzt et al. |
| 2021/0189662 A1* | 6/2021 | Davis, Jr. ............. D06N 7/0065 |
| 2021/0404127 A1* | 12/2021 | Vachon ................ D06N 7/0065 |

FOREIGN PATENT DOCUMENTS

| | | |
|---|---|---|
| WO | 2010085994 A1 | 8/2010 |
| WO | 2012013290 A1 | 2/2012 |
| WO | 2016102264 A1 | 6/2016 |

OTHER PUBLICATIONS

English Abstract for WO2016102264, Jun. 30, 2016.
English Abstract for WO2010085994, Aug. 5, 2010.
English translation of International Preliminary Report on Patentability for PCT/EP2021/059002, Oct. 20, 2022.

* cited by examiner

2x3 with notches

2x3 without notches

Notch A

Notch B

Notch D

Notch E

Slot A

Slot B

Slot C

Slot E

Corner inside, notch inside A

Corners inside, notch inside B

Corners inside, notch inside C

Corners inside, notch inside D

Corners inside, notch inside E

Reference F

Notch F

S structure F

Corner F

Corner G

Corner H

Corner I

Corner J

Corner K

Corner L

Reference A

Notch A

Notch B

A1 (S structure)

a)

a)

b)

a)

b)

a)

b)

a)

b)

a)

b)

MOULDED BODY COMPRISING A STRUCTURED SURFACE FOR CONTROLLED ADHESION

This patent application is a U.S. national stage application of PCT international application PCT/EP2021/059002 filed on 7 Apr. 2021 and claims priority of German patent document 10 2020 109 939.8 filed on 9 Apr. 2020, the entireties of which are incorporated herein by reference.

FIELD OF THE INVENTION

The invention relates to a shaped body with structured surface for controlled adhesion of objects or at surfaces. This adhesion may be controlled by structural features of the structured surface.

PRIOR ART

The molecular adherence between two objects may be controlled and/or intensified through fiberlike surface structures. This principle is known as the gecko effect. If a structured elastomer surface is pressed with a certain pressing force against a comparatively flat surface, van der Waals interactions may develop. The reversible adherence as well, i.e., the possibility of deliberately switching adherence and detachment, is known from nature. However, while the gecko produces the detachment by peeling away its adherence fibers, for technical structures this is often not possible and usually meaningful only when shearing adherence, i.e., adherence in the direction of the substrate/object surface, is to be utilized. In the case of what is termed normal adherence, this being an adherence force perpendicular to the object surface, the detachment must be initiated differently.

The objective is to deliberately vary the effective contact area between the adherence structures and the object surface in order to switch between adherence (high contact area) and detachment (low contact area) and so to enable selective detachment.

It is known that when using structures having a high aspect ratio, e.g., >3, it is possible to use the phenomenon referred to as Euler buckling for detachment from a substrate. It is known that the reduction in the contact area may be brought about by buckling of pillars under compressive loading. If compressive loading is sufficient, an elastic instability leads to the kinking of the pillars. This is also referred to as Euler buckling. The critical force is:

$$F=(n\pi/L)^2 EI$$

where E is the elasticity modulus, I is the area model of inertia, L is the length (height) of the pillar, and n is a prefactor depending on the mechanical restraint of the pillar. The area moment of inertia for a cylindrical structure is $I=\pi d^4/64$. This produces the following relation: pillars with a large height, small diameter or low elasticity modulus buckle under lower forces than pillars with a short length, large diameter or high elasticity modulus. Here, additional pressure in the direction of the object causes the buckling of the structure and hence a reduction in the contact area with the surface. This leads to a reduction in the adhesion. For this, however, a pressure in object direction is necessary in order to initiate the detachment. This is a problem particularly in the case of sensitive objects.

OBJECT

It is an object of the invention to provide a structure which, particularly in the case of normal adherence, enables easy detachment.

ACHIEVEMENT

This object is achieved by the inventions with the features of the independent claims. Advantageous developments of the inventions are characterized in the dependent claims. The wording of all the claims is hereby made part of the content of this description by reference. The inventions also encompass all meaningful, and more particularly all stated, combinations of independent and/or dependent claims.

The object is achieved by a shaped body having a structured surface whose structuring comprises a multiplicity of pillars (projections) each having at least one stem and comprising at least one end face pointing away from the surface. By this end face the pillars make contact with the surface of the adhering object, with at least one pillar comprising at least one structural feature which leads to directed deformation of the pillar on loading of the pillar, with a change in the adhesion.

The loading of the pillar is preferably a loading of the pillar in normal direction relative to the end face of the projection.

It preferably comprises a compression of the pillar along its stem.

It is known that on sufficient loading of a pillar the resultant buckling of pillars leads to a change in the contact area, i.e., in the adhesion. Thus the device can be switched reversibly between an adhesive state into a nonadhesive state. The force to be employed is dependent on factors including the effective complex modulus of the pillar.

At the same time, for a given structure the force to be employed is possible only through a change in the material or in the structure. Flexible adaptation to the object to be grasped and/or to the surface to be contacted is difficult to achieve.

Moreover, on loading, there is an uncontrolled deformation of the pillars, with a direction and extent which are difficult to control. Another consequence of this is that there may be a lateral displacement or the object held gets into an unstable state and, for example, slips off.

Surprisingly it has been found that through the introduction of a structural feature, the force in normal direction that is required for switching can be easily controlled and adapted.

The elasticity modulus of the pillars is preferably constant, but may also exhibit an axial or lateral gradient.

The perpendicular height of the end face refers to the distance of the end face from the surface on which the pillars are arranged.

In one preferred embodiment of the invention the projections of the structured surface of the invention have a columnar configuration. This means that they are preferably pillars which are configured perpendicular to the surface and which have a stem and an end face, where the stem and the end face may have any desired cross section (for example, circular, oval, rectangular, square, rhomboidal, hexagonal, pentagonal, etc.).

The pillars are preferably configured such that the perpendicular projection of the end face onto the base area of the pillar forms an area of overlap with the base area, with the area of overlap and the projection of the area of overlap onto the end face generate a body which lies completely within the pillar. In one preferred embodiment of the invention the area of overlap comprises at least 50% of the base area, preferably at least 70% of the base area, and more preferably the area of overlap comprises the entire base area. The pillars, therefore, are preferably not inclined, but they may be. The pillars have a preferably perpendicular arrangement, disregarding the at least one structural feature.

In one preferred embodiment, the end face is oriented parallel to the base area and to the surface. If the end faces are not oriented parallel to the surface and therefore have different perpendicular heights, the mean perpendicular height of the end face is deemed to be the perpendicular height of the pillar. In this context, possible structural features comprising the end face are disregarded.

In one embodiment the end face of the pillars is larger than the base area.

In one preferred embodiment of the invention the stem of the pillar, relative to its mean diameter, has an aspect ratio of height to diameter of 2 to 15, preferably of 2 to 10, more preferably between 3 and 5.

In one embodiment the aspect ratio is up to 10, more particularly up to 5.

A mean diameter here refers to the diameter of the circle which has the same area as the corresponding cross section of the pillar, averaged over the entire height of the pillar, disregarding structural features.

In a further embodiment of the invention the ratio of the perpendicular height of a pillar to the diameter at a certain height over the entire height of the pillar is always 2 to 15, preferably 2 to 10, more preferably between 3 and 5. In one embodiment this aspect ratio is up to 10, more particularly up to 5. This is preferably also true of the minimum diameter of the pillars. This is relevant when the pillars, with an oval base area, for example, have a minimum and a maximum diameter. Regions having structural features here are disregarded.

The pillars may have broadened end faces, referred to as mushroom structures. The broadened end face may be either symmetrical or asymmetrical and be arranged either symmetrically or asymmetrically on the stem. This may promote the start of the detachment of the structure, if, for example, the broadening is oriented preferentially toward one side.

The end faces of the pillars may themselves be structured in order to increase their surface area. In that case the perpendicular height of the pillars is deemed to be the mean perpendicular height of the end face.

In one preferred embodiment the perpendicular height of all the pillars is in a range from 1 µm to 10 mm, preferably 1 µm to 5 mm, more particularly 1 µm to 2 mm, preferably in a range from 1 µm to 1 mm. The diameter in this case is chosen in accordance with the aspect ratio.

In another preferred embodiment the perpendicular height of all the projections is in a range from 10 µm to 1 mm, preferably 10 µm to 800 µm, more preferably 50 µm to 600 µm, very preferably 100 µm to 500 µm. The diameter in this case is chosen in accordance with the aspect ratio.

In one preferred embodiment the base area of a pillar corresponds in terms of area to a circle having a diameter between 1 µm to 5 mm, preferably 1 µm and 2 mm, especially preferably between 1 µm and 500 µm, more preferably between 5 µm and 200 µm. In one embodiment, the base area of a pillar is a circle having a diameter between 1 µm and 500 µm, preferably 10 µm and 200 µm.

The mean diameter of the stems is preferably between 0.1 µm to 5 mm, preferably 0.1 µm and 2 mm, especially preferably between 1 µm and 500 µm, preferably 5 µm to 200 µm. The height and the mean diameter are preferably adapted in accordance with the preferred aspect ratio.

In one preferred embodiment, with broadened end faces, the surface area of the end face of a pillar is at least 1.01 times, preferably at least 1.4 times, as large as the area of the base area of a pillar. It may be larger by a factor, for example, of 1.01 to 2.

In another embodiment, the end face is between 5% and 100% larger than the base area of the pillar, more preferably between 5% and 20% of the base area of the pillar.

In one preferred embodiment the distance between two pillars is less than 2 mm, more particularly less than 1 mm. A distance below 500 µm is preferred, more particularly of 10 µm to 400 µm. The distance here refers to the minimum distance from the edge of the base area of the pillar to the edge of the base area of the next pillar.

The at least one structural feature is preferably a local structural feature. This means that, relative to a base structure of a pillar, it always relates only to a delimitable region of the pillar. The at least one structural feature, relative to the height of the pillar, preferably relates to not more than 80% of the height of a pillar. The structural feature consequently leads to a local mechanical weakening or strengthening on loading of the pillar.

The at least one structural feature is preferably a recess and/or bulge of the pillar relative to its basic shape. A flexion of the pillar is the combination of a recess with a bulge.

In one preferred embodiment of the invention the structural feature is selected from notches, slots, flexions, chamfers (bevels), protrusions and/or bulges.

The at least one structural feature is preferably selected from recesses such as notches, slots or chamfers, or flexions.

The pillars may also have multiple structural features or multiple different structural features.

The at least one structural feature results in a directed deformation. For this it is arranged preferably on one side of the pillar. This allows the deformation to be steered toward or away from that side. As a result, minor inaccuracies in the orientation of the shaped body to the surface cannot cause any alteration of the detachment behavior.

Preferably the at least one structural feature causes the pillar to deform, more particularly buckle, earlier for a given loading. This allows the pressing force needed for the deformation to be lowered. The deformation in turn produces a reduction in the strength of the adhesion of the pillar, to the point of a reduction in the contact area of the end face. As a result, the shaped body can be switched into a nonadhesive state even at relatively low loading levels. This makes the shaped body easier to detach. Moreover, the force to be expended for the detachment is lower.

A pillar may also have multiple structural features, especially different structural features. These features may be complementary or constructive in their effect. Taken together, the structural features overall determine the resulting deformation of the pillar. This is predetermined by the sum total of the interactions.

The use of structural features makes it possible to easily adapt and alter the adhesive properties of the shaped body. The features may in particular be tailored precisely to a particular use. Since there is no need to alter the material, numerous different variants can be produced with one manufacturing technology.

In one preferred embodiment the at least one structural feature is a recess, more particularly at least one notch or at least one slot, on the stem of the pillar.

In this embodiment the at least one structural feature leads to a local weakening of the pillar. As a result of this, the pillar buckles preferentially under load opposite to the side of the weakening. Preferably at least one structural feature is arranged centrally. This means preferably that it is located at a height of 10% to 90% of the perpendicular height of the pillar. In the case of a flexion, the maximum of the flexion is situated preferably in a range from 40% to 60% of the height of the pillar. The preferred range may differ according to the structure of the weakening.

The recess preferably has a maximum depth of 50% of the diameter of the pillar at the height of the recess, preferably of not more than 40%. In this case, the depth refers to the innermost point of the recess relative to the normal to the outer face of the pillar.

The recess preferably has a maximum extent of at least 10% of the diameter of the pillar at the height of the recess, where the extent is defined as the distance on the surface of the pillar without recess.

The recess may be very different in its shaping. It is preferably a recess which narrows constantly toward the inside. The volume enclosed by the recess within the pillar may be part, in the case of a notch, of a geometric shape such as a sphere, a cylinder, preferably a circular cylinder, an ellipsoid, a cone, a pyramid or a cube. A shape without edges is preferred, such as a part of a sphere, of a cylinder or of an oval. A particularly preferred shape is the part of a cylinder, oval or circular, where the area of the recess is part of the outer surface of the cylinder. The axis of the cylinder is preferably perpendicular to the pillar. The recess may in that case be described as an elongated depression with a round inner face.

In the case of a slot, the volume may have the shape of a fin. The slot may be horizontal, but may also be inclined. The opening angle of the section is preferably 0° to 70°, preferably 0° to 50°, more preferably 10° to 40°.

In another embodiment of the invention at least one structural feature is a flexion. This means that the stem of the pillar does not run vertically, but instead, preferably in a region from 20% to 80% of the height of the pillar, exhibits an increasing and decreasing displacement of the pillar toward one side. This leads to a local flexion along the stem of the pillar. The relation between end face and base area is retained here. There is preferably no change in the shape of the cross section of the pillar in the region of the flexion. This means that the pillar does not have any varying diameter along the structural feature, the pillar instead having a flexion. At the start and end of the flexion, the respective cross-sectional area is congruent with the base area of the pillar. In the course of the flexion, the overlap of the respective cross-sectional area in relation to the base area reduces preferably by up to 20%, preferably up to 30%. The profile of the flexion along the longitudinal axis of the pillar is preferably symmetrical. The flexion preferably has a constant profile, meaning that it does not have any edges or corners along the height of the pillar. The flexion dictates the subsequent deformation and so leads to a directed deformation. The bending is therefore preferably only toward one side.

In another embodiment of the invention at least one structural feature comprises parts of the end face of the pillar.

The end face of the pillar preferably comprises at least 30% of the area of the end face without structural feature. This ensures that there is still sufficient area available for the adhesion. A region of at least 40% to 80% is preferred. The recess in this case comprises at least part of the edge of the end face. The remaining end face is preferably a continuous area.

The structural feature in this case is preferably a recess. This means that on one side the pillar has no end face which contacts the surface without loading. On loading, the deformation then takes preferentially in the direction of this side.

The surface of the recess may in this case have different shaping. In this case, preferably, the recess has a planar surface which exhibits a common, straight edge with the end face. On loading it is possible, as a result of the deformation for the surface of the recess to contact the surface. This enables switching between these two surfaces of the pillar.

The angle between the surface of the recess and the end face here is preferably between 10° and 70°.

With this embodiment, the end face can be influenced directly. It is therefore possible for the adhesion force and the load beyond which deformation occurs to be controlled over a very large range as well. The deformation also occurs much earlier, since the contact area of the pillars is lower in contrast to structural features on the stem.

In contrast to recesses on the stem, the recess comprising the end face leads to deformation in the direction of the recess. With recesses on the stem, the deformation leads to a buckling opposite to the recess. Preferred pillars are those which exhibit a definite direction of deformation irrespective of their type of structural features, under the selected conditions.

The elasticity modulus of the pillar is preferably 50 kPa to 1 GPa, preferably 500 kPa to 20 MPa, more preferably 1 MPa to 10 MPa. The elasticity modulus of a pillar is preferably constant. A pillar may alternatively comprise materials with different elasticity moduli. Hence it is possible, for example, to form the region comprising the end face from a particularly soft material.

The elasticity of the pillars may also be defined by the hardness of the material used, preferably an elastomer. A preferred hardness for the material of the pillars is from Shore A 20 to Shore A 100, preferably Shore A 40 to Shore A 80.

The pillars may consist of many different materials, elastomers being preferred. For higher elasticity moduli it is also possible to use thermosets.

The pillars may therefore comprise the following materials:

epoxy- and/or silicone-based elastomers, thermoplastic elastomers (TPE), polyurethanes, epoxy resins, acrylate systems, methacrylate systems, polyacrylates in the form of homopolymers and copolymers, polymethacrylates in the form of homopolymers and copolymers (PMMA, AMMA acrylonitrile/methyl methacrylate), polyurethane (meth)acrylates, silicones, silicone resins, rubber, such as R rubber (NR natural rubber, IR polyisoprene rubber, BR butadiene rubber, SBR styrene-butadiene rubber, CR chloroprene rubber, NBR nitrile rubber), M rubber (EPM ethene-propene rubber, EPDM ethylene-propylene rubber), unsaturated polyester resins, formaldehyde resins, vinyl ester resins, polyethylenes in the form of homopolymers or copolymers, and also mixtures and copolymers of the aforesaid materials. Also preferred are elastomers which are approved for use in the packaging, drug and food sector by the EU (under EU Regulation 10/2011 of Jan. 14, 2011, published on Jan. 15, 2011) or FDA, or silicone-free UV-curable resins from PVD and CVD process technology. Polyurethane (meth)acrylates here stands for polyurethane (meth)acrylates, polyurethane (acrylates) and also mixtures and/or copolymers thereof.

Preference is given to epoxy- and/or silicone-based elastomers, polyurethane (meth)acrylates, polyurethanes, silicones, silicone resins (such as UV-curable PDMS), polyurethane (meth)acrylates or rubber (such as EPM, EPDM).

The pillars are preferably solid with the exception of the structural features.

The shaped body comprises a multiplicity of pillars. They preferably have a regular arrangement. All of the pillars of the shaped body preferably have at least one structural feature.

Depending on the contact area required, the shaped body has 3 to 50 pillars, more particular 3 to 20 pillars. It is also possible for 2 or more shaped bodies with groups of pillars to be combined to form a common adhesion device.

In one preferred embodiment the structural features of the pillars are arranged such that the deformation in at least one direction does not lead to any lateral displacement. This can be achieved by the relative deformations of the pillars canceling one another out in this direction. This may be achieved, for example, by arranging the structural features on the individual pillars such that the lateral forces cancel one another out as a result of the deformation of the pillars. This can be achieved, for example, by the direction of deformation, i.e., the directions of the buckling of the pillars, pointing to or away from a point, a common symmetrical plane or rotational axis. This may be achieved, for example, by concentric arrangement of the pillars and by the buckling direction being in each case radial to this circle. The recesses on the respective pillars are in that case arranged such that the deformation leads to outward buckling, or to inward buckling of the pillars.

The invention further relates to a method for reversible adhesion of a shaped body of the invention on a surface.

It is also possible for two or more of the shaped bodies of the invention to be used in parallel in order to grasp an object or two or more objects.

Individual method steps are described in more detail below. The steps need not necessarily be carried out in the sequence stated, and the method to be outlined may also have further steps not stated.

For this, end faces of the pillars of the shaped body of the invention are contacted with the surface, and so an adhesive bond is developed between shaped body and surface.

For the detachment of the shaped body, the shaped body is loaded in the direction of the surface (normal loading). As a result of this movement there is a deformation of the pillars, leading to the at least partial detachment of the end faces. This reduces the contact area contributing to the adhesion and lowers the adherence force to the point of complete detachment. Because of the structural features, in particular in the form of recesses, the force for deformation may be adjusted appropriately for the object, without having to change the material.

With very small and sensitive components in particular, such as microchips, integrated circuits, displays or touchscreens, the shaped body of the invention offers opportunities for the selective adhesion and detachment without great loading of the object. Also, with this method, it is possible to address objects which cannot be picked up without further measures via a conventional suction device.

Further details and features are evident from the following description of preferred exemplary embodiments in conjunction with the dependent claims. Here, the respective features may be actualized in each case alone or collectively in combination with one another. The possibilities for achieving the object are not confined to the exemplary embodiments. For example, range figures always encompass all—unstated—in-between values and all conceivable subintervals.

The exemplary embodiments are represented schematically in the figures. Identical reference numbers in the individual figures here designate identical or functionally identical elements or elements which correspond to one another in terms of their functions. Specifically:

Figure 26:
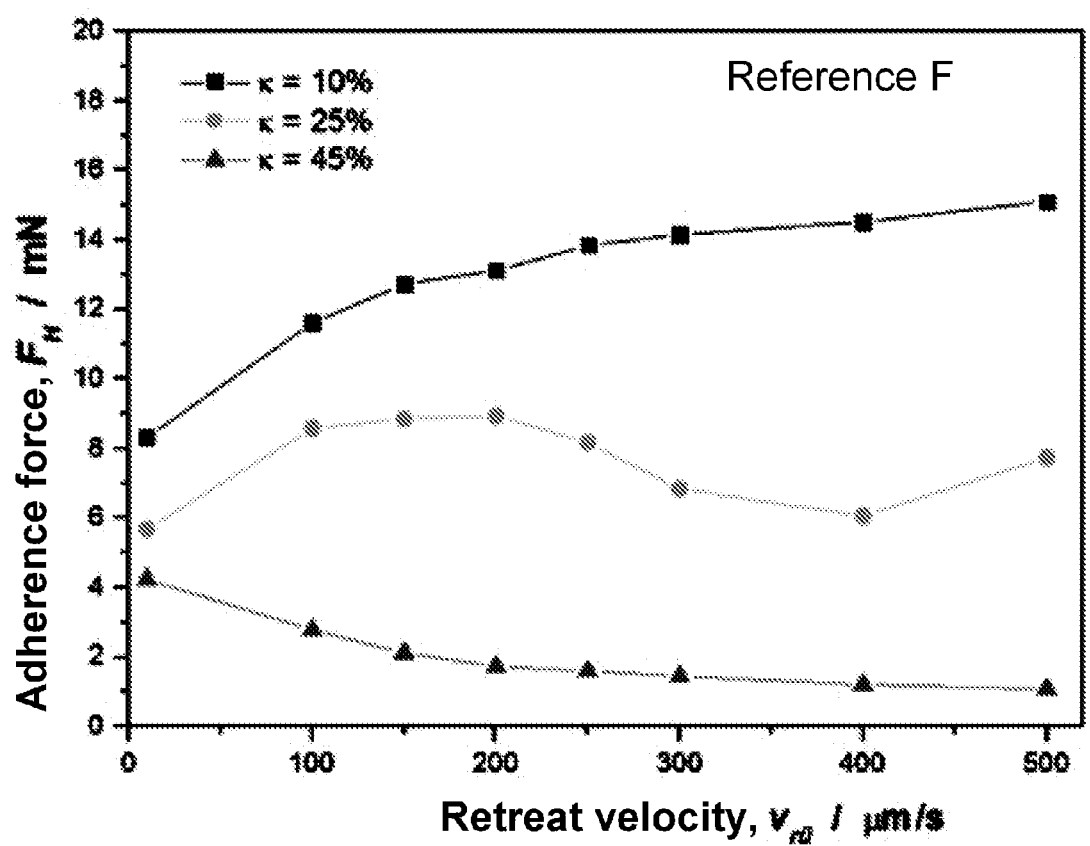
Figure 26:
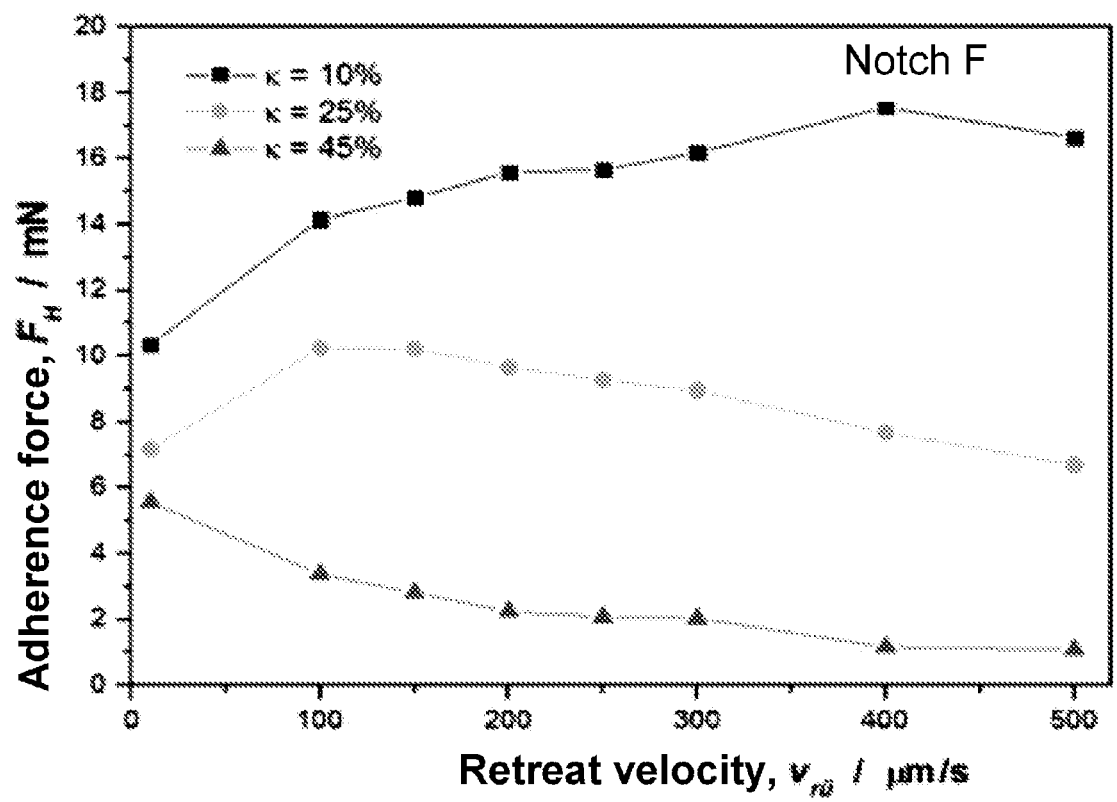
Figure 27:
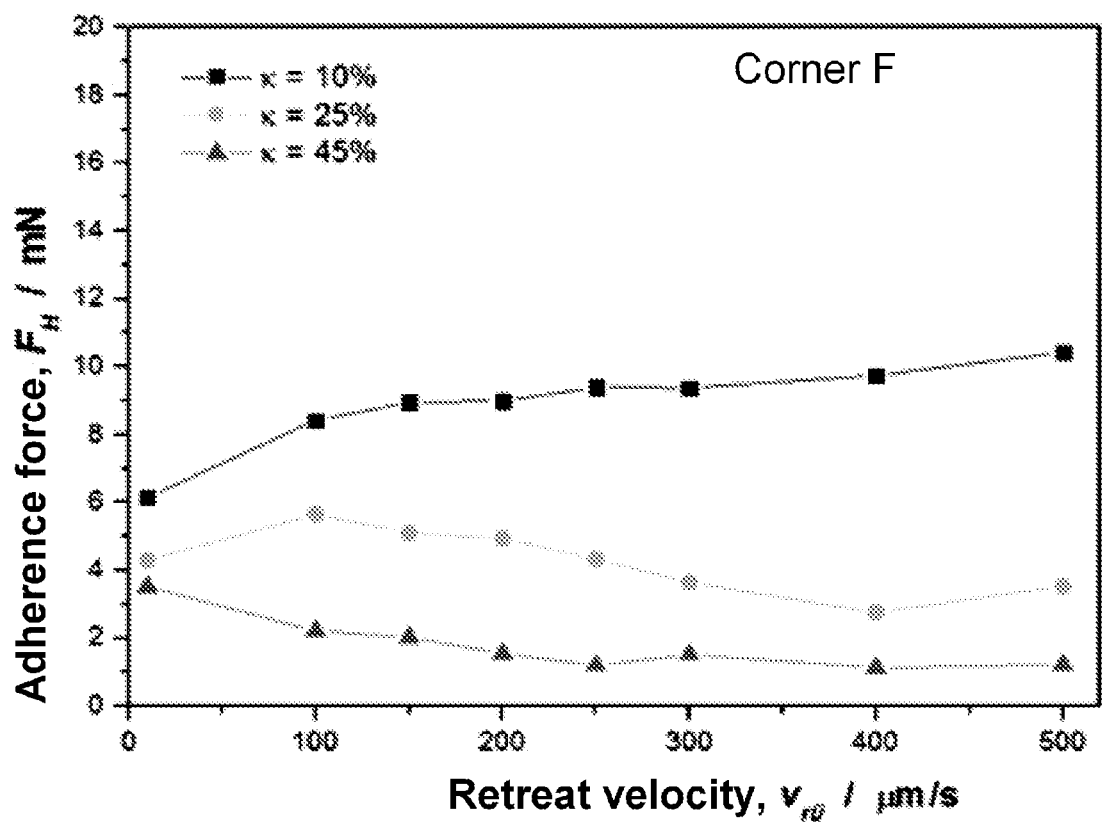
Figure 27:
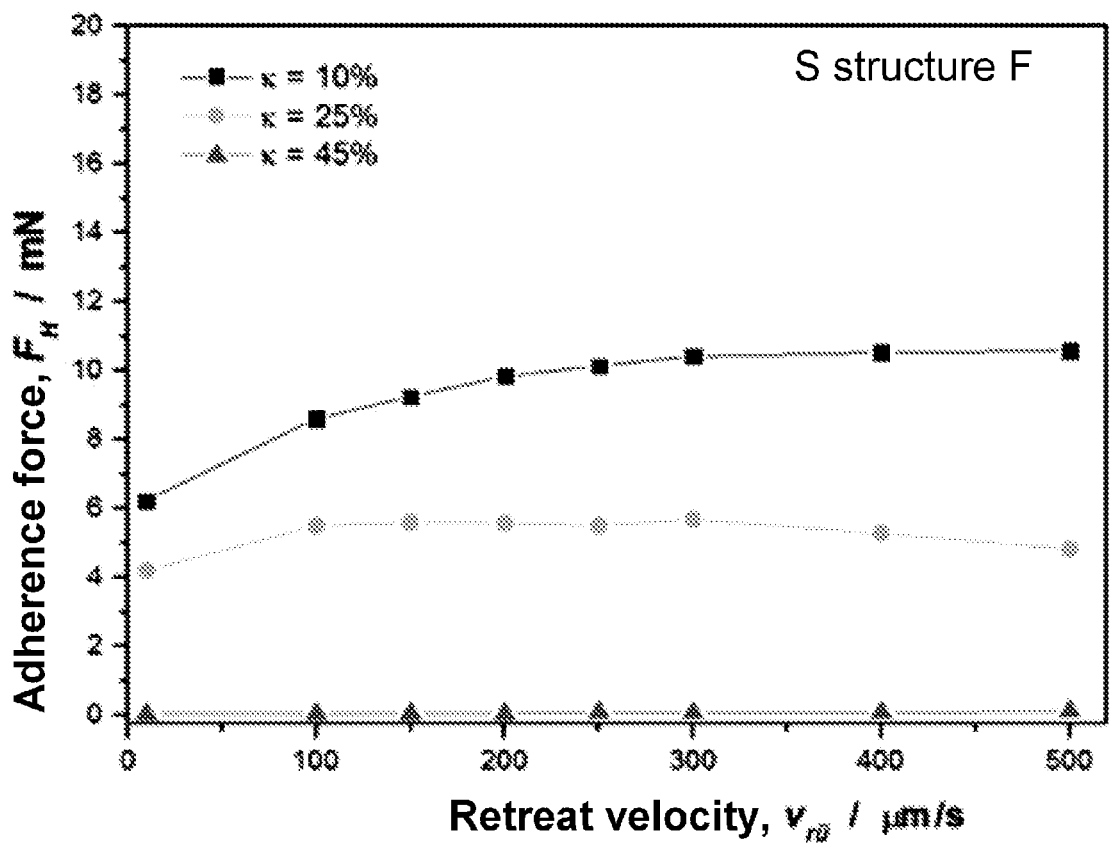
Figure 28:
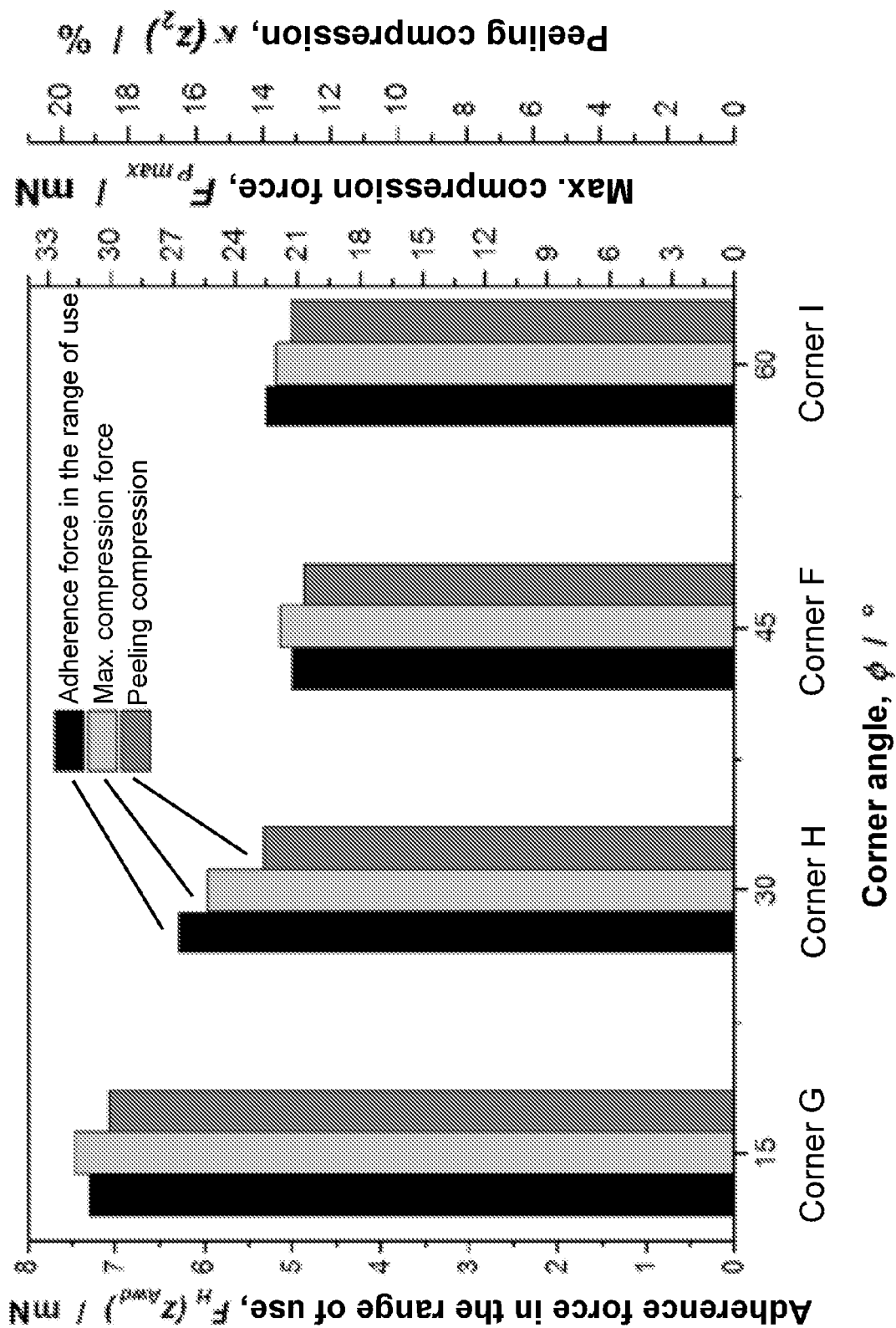
Figure 29:
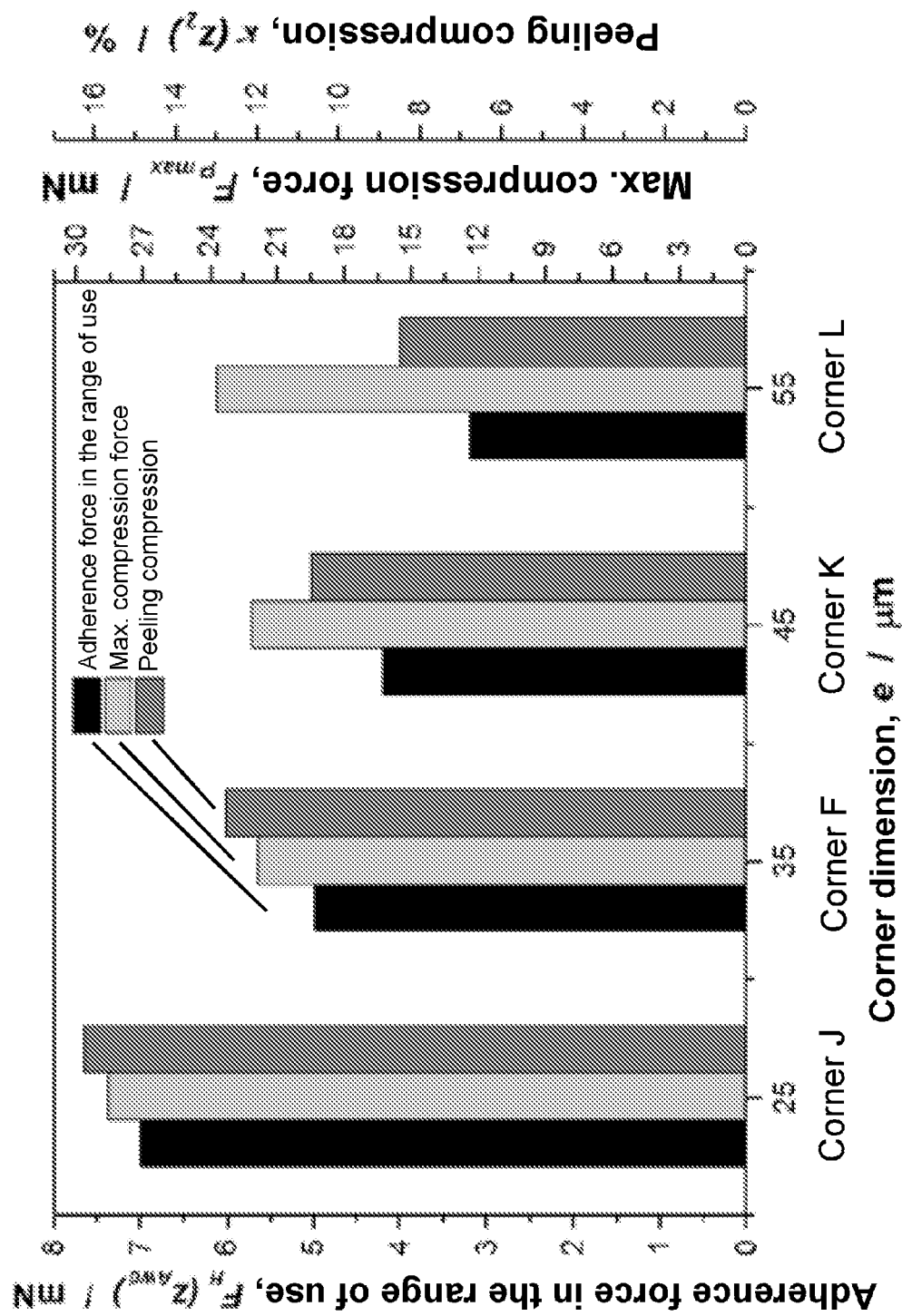

FIG. 26 shows influence of the velocity on detachment on the adherence force for compressions of 10%, 25% and 45% a) reference F, b) notch F, 250 mN force measuring sensor, advancing velocity 10 μm/s, detachment velocity 5 μm/s-500 μm/s;

FIG. 27 shows influence of the velocity on detachment on the adherence force for compressions of 10%, 25% and 45% a) corner F, b) S structure F, 250 mN force measuring sensor, advancing velocity 10 μm/s, detachment velocity 5 μm/s-500 μm/s;

FIG. 28 shows measuring series relating to the dependency relationship between the corner angle according to table 9 and the adherence force (each first column: adherence force in the range of use; each second column: max. compression force; each third column: peel compression);

FIG. 29 shows measuring series relating to the dependency relationship between the corner dimension according to table 9 and the adherence force (each first column: adherence force in the range of use; each second column: max. compression force; each third column: peel compression);

PRODUCTION

The structures were produced in three steps. First the positive structures were produced by means of 2-photon polymerization (2PP), after which this structure was modeled using an elastomer (preferably silicone) to form a negative shape, and lastly an impression was taken from this negative shape of the positive structure, using a further elastomer (polyurethane or silicone).

2-Photon Polymerization (2PP)

The surface of the substrates was activated in a plasma oven for 3 minutes. Then a silanization was performed with the reagent 3-(trimethoxysilyl)propyl methacrylate (MPTS), by placing a few drops of the reagent onto the substrate. After 60 minutes, the reagent was washed off with ethanol and the substrate was dried.

The structures were written using the Photonic Professional GT or GT2 (PPGT or PPGT2) from Nanoscribe. Writing took place using the Zeiss lenses 10×(NA 0.3), 25×(NA 0.8) and 63×(NA 1.4). Nanoscribe photoresists IP-S, IP-Dip, IP-Q, IP-G 780 were used. The substrates used were borosilicate glass, quartz glass (25×25×0.7) mm or glass coated with indium-tin oxide (ITO). The writing parameters were adapted so that the structures could be reproduced without defects and as exactly as possible.

For example, writing took place with a 25×(NA 0.8) lens with 26 mW laser power and a writing speed of 100,000 μm/s onto ITO-coated glass with IP-S. The structures were written in solid form, since the stability is needed for the impression in order to prevent the structures collapsing.

The structures produced using 2PP were developed in the solvent propylene glycol monomethyl ether acetate (1-methoxy-2-propyl acetate, MPA) until the unpolymerized photoresist dissolved. The MPA solvent was then replaced by isopropanol. Remaining in the isopropanol solvent, the written structure was post polymerized for 5 minutes under a nitrogen atmosphere with a UV lamp. The structure was subsequently removed cautiously from the isopropanol and rinsed.

Production of a Negative Shape

First of all the surface of the written structure was activated in a plasma oven for a minute. Subsequently a number of drops of the reagent (3,3,3-trifluoropropyl) trimethoxysilane were placed onto the structure and the substrate, and after 45 minutes were washed off with ethanol, and the structure was dried.

An impression was taken of the substrate using a silicon elastomer, as for example with Köraform A40 (from CHT Bezema) or Elastosil® M4601 (from Wacker).

Production of the Positive Structures

The model may either be impressed directly onto a suitable substrate (e.g. a metal peg with which the structure is to be handled), to which it adheres as a result of the curing, or may be bonded adhesively to a holder only after curing has taken place. Materials used included, inter alia, polyurethane (PU) PMC-780 (from Smooth-On) with a Shore A hardness of 80, PMC-770 (from Smooth-On) with a Shore A hardness of 70, or silicones such as Sylgard 184 (Dow), Silopren® LSR 7060 (Momentive) or KER-4690 (Shin-Etsu). A small amount of the material was placed cautiously onto the corresponding mold. The mold was then covered accordingly under reduced pressure with a full filling. The structures obtained as impressions were characterized by microscope.

Structures Produced

Structures having different features for influencing the pillars were produced, in particular with notches, slots and flexions, but also the modification of the end face (contact area) with corners for a deliberate contact area changeover. An overview of the structures produced, with the corresponding dimensions, is given below.

Figure 1:
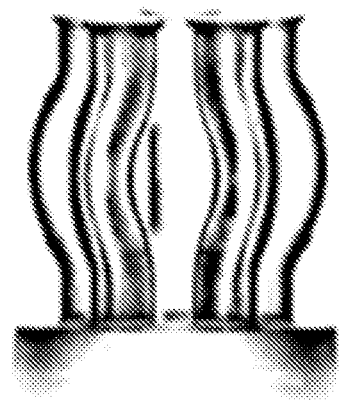
FIG. 1 shows micrographs (left) and three-dimensional representations (right) of the structures A2 and A2.
Figure 1:
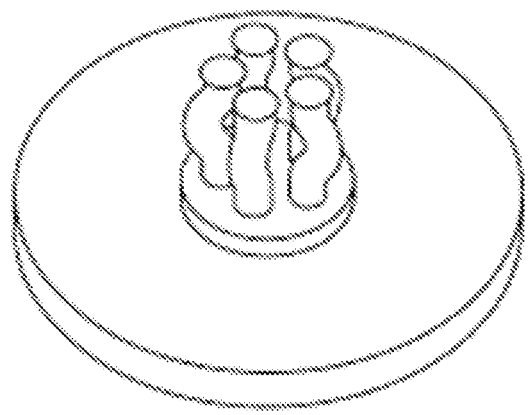
Figure 1:
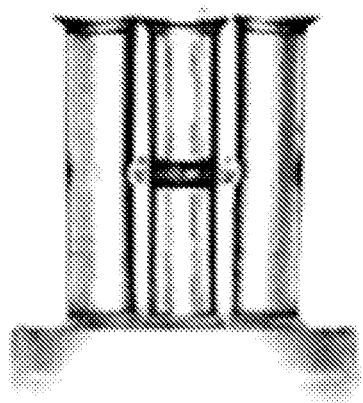
Figure 1:
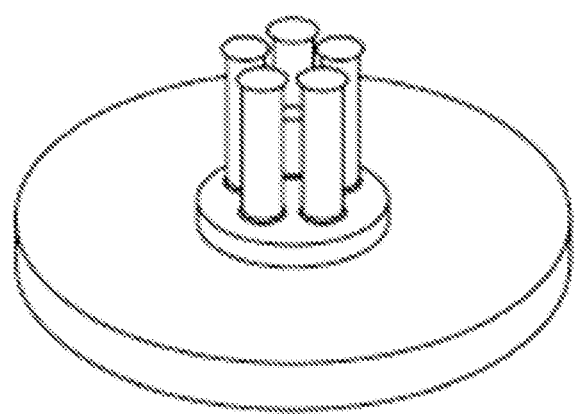
Figure 2:
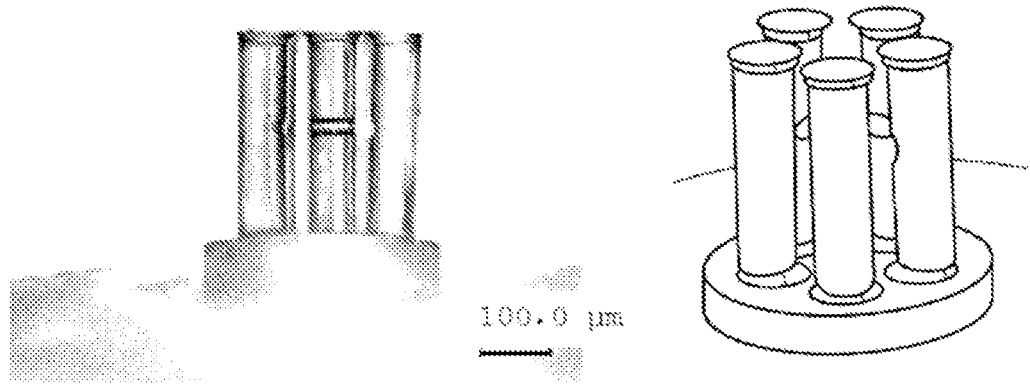
FIG. 2 shows micrographs (left) and three-dimensional representations (right) of the structures A3, A4 and A5.
Figure 2:
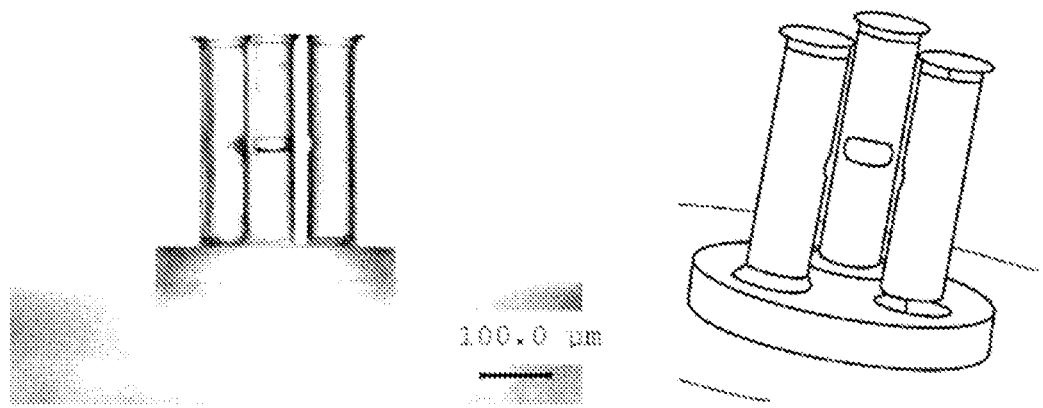
Figure 2:
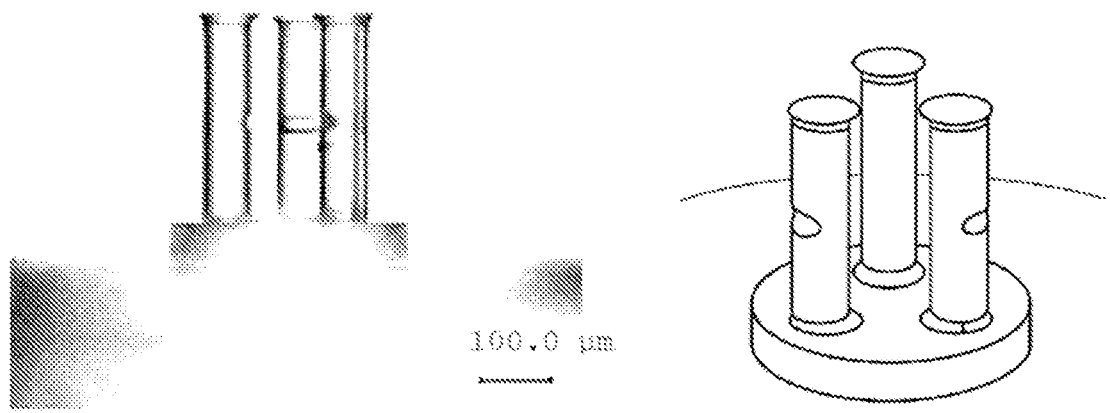
Figure 3:
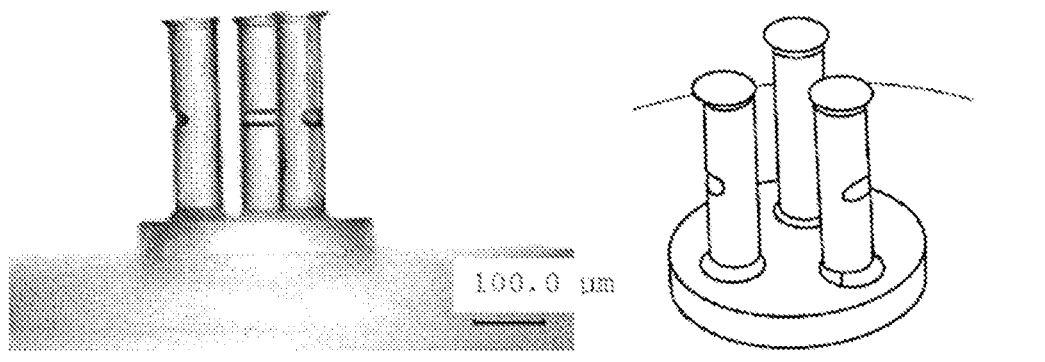
FIG. 3 shows micrographs (left) and three-dimensional representations of the structures A6 and A7.
Figure 3:
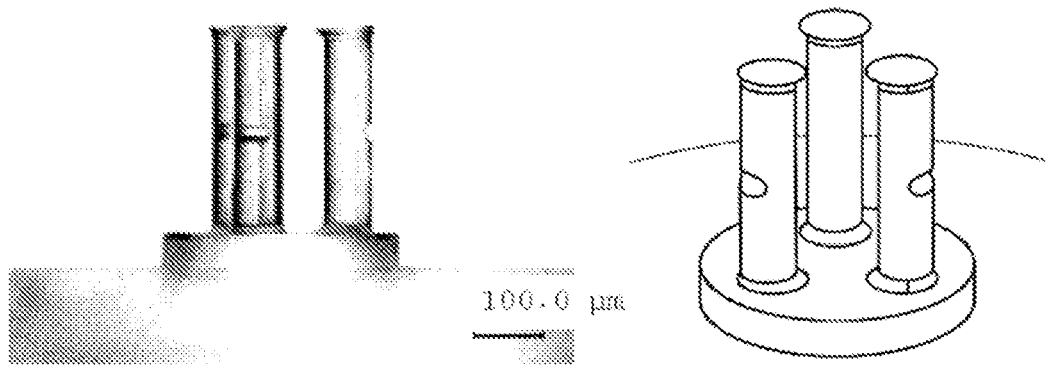

Table 1 shows the dimensions of the various structures of type A1 to A7. FIGS. 1, 2 and 3 depict micrographs and three-dimensional representations of the various structures.

Table 2 reports the respective features of the individual structure.

Figure 4:
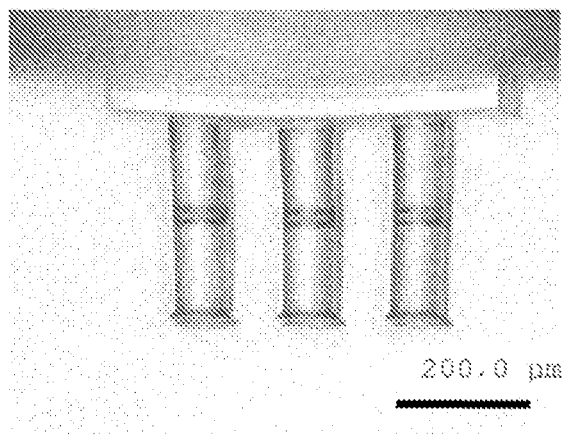
FIG. 4 shows micrographs (left) and three-dimensional representations of structures, 2×3 arrangement of the pillars.
Figure 4:
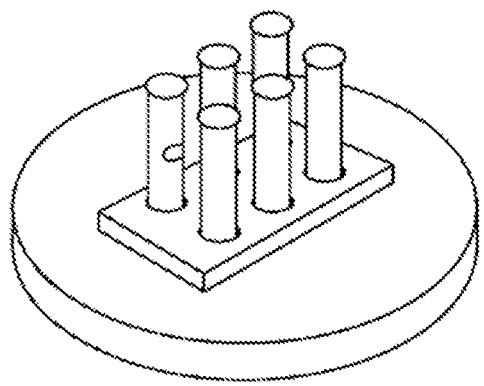
Figure 4:
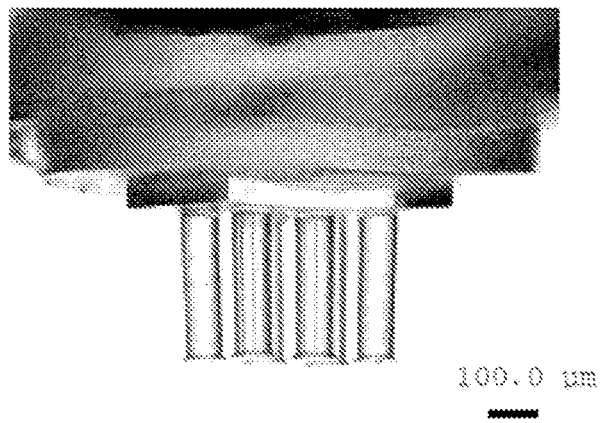
Figure 4:
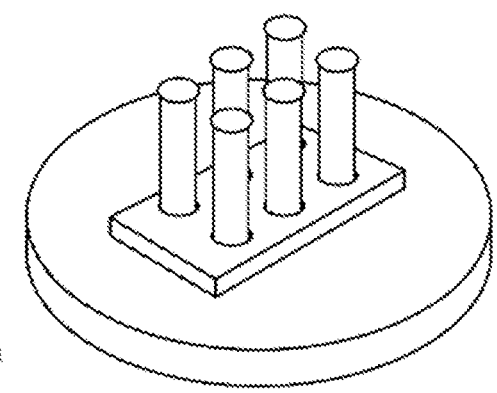

Table 3 shows the dimensions and features of the structures from FIG. 4.

Figure 5:
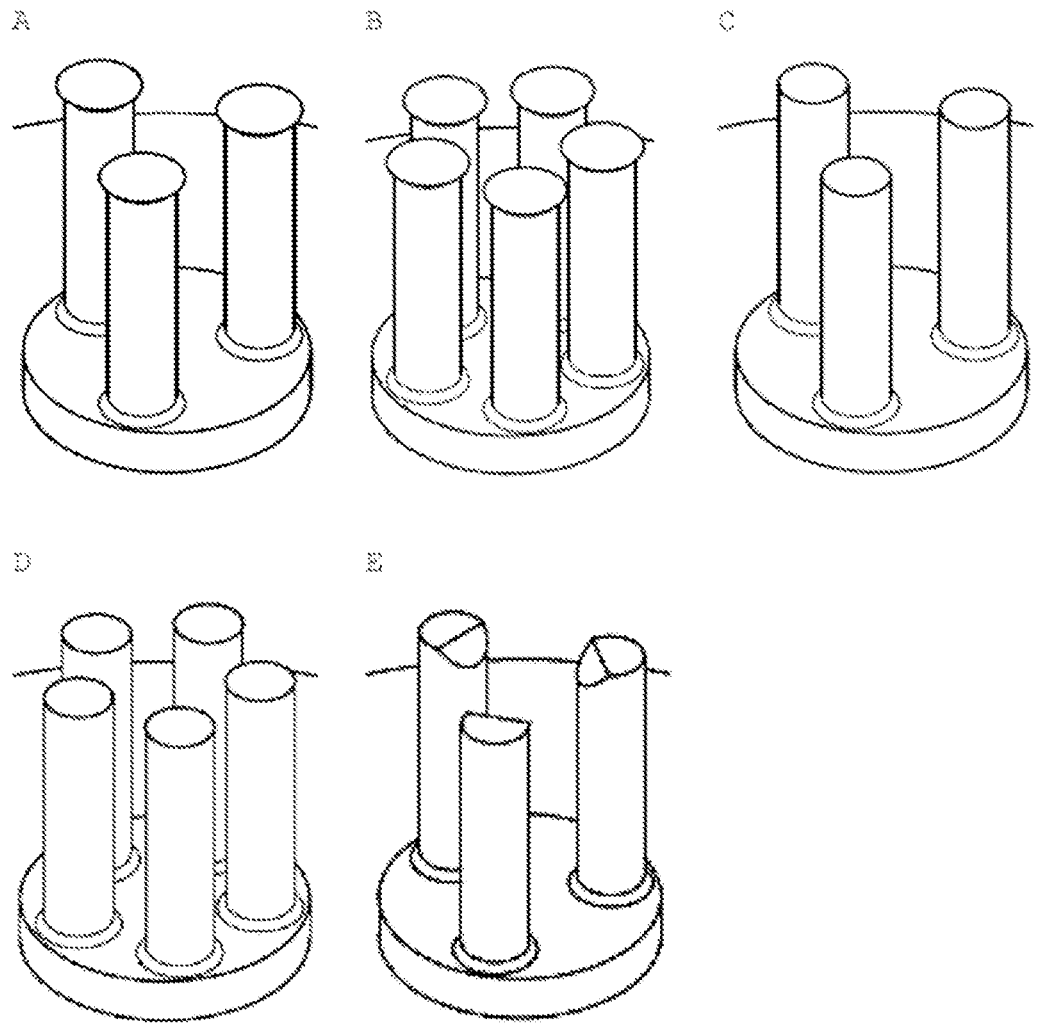
FIG. 5 shows schematic representations of the reference structures A, B, C, D, E.

Table 4 shows the features of the reference structures produced, from FIG. 5.

Figure 6:
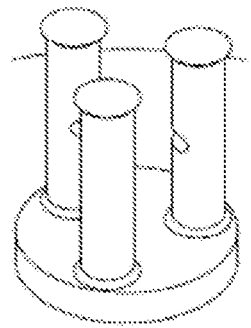
FIG. 6 shows schematic representations and cross sections of various structures with a notch (notch A to notch E)
Figure 6:
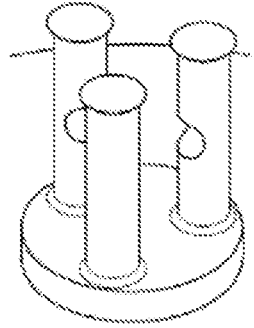
Figure 6:
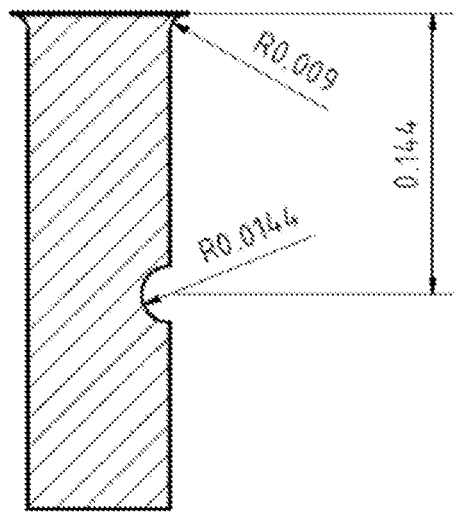
Figure 6:
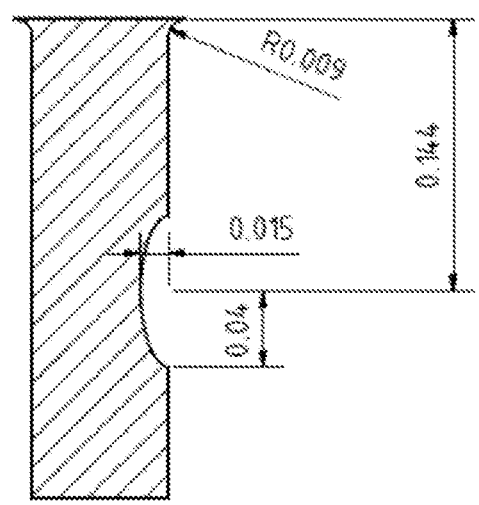
Figure 6:
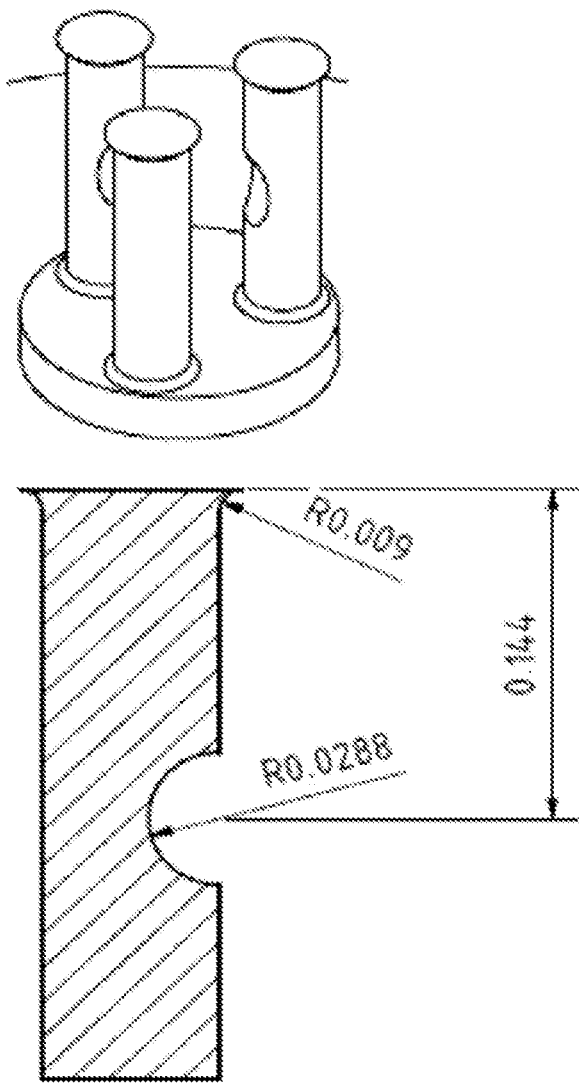
Figure 6:
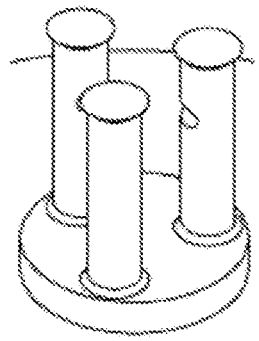
Figure 6:
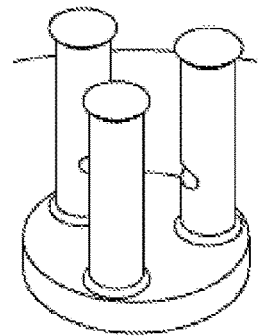
Figure 6:
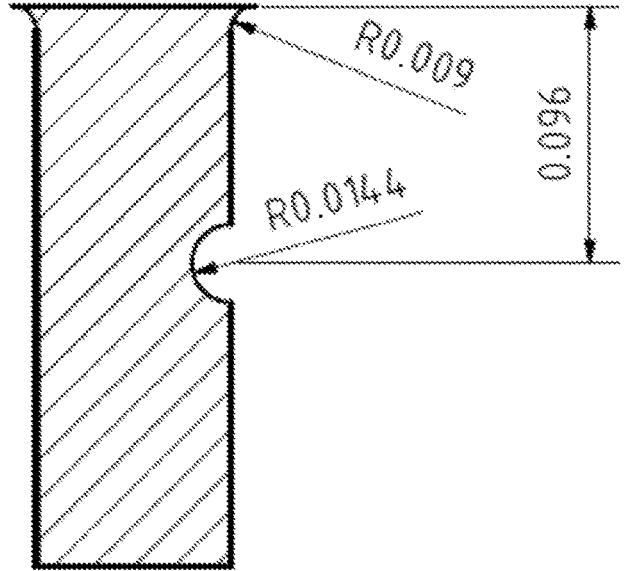
Figure 6:
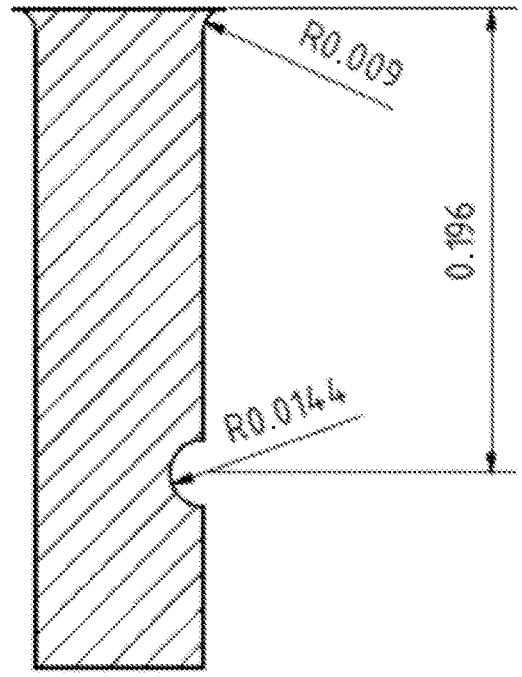

Table 5 shows various structures with notches. Schematic representations and the cross section of the respective structure are shown by FIG. 6. A typical shape of a notch is a hemisphere having a radius of 14.4 μm (20% of the column diameter), 28.8 μm (40% of the column radius) or an oval notch radius. Typical positions of the notch are central, near to the contact area (end face) or near to the backing layer, preferably central, since it is there that the buckling takes place.

Figure 7:
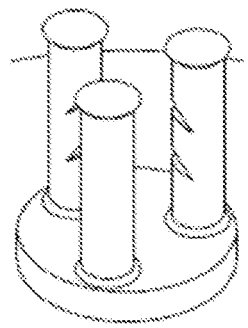
FIG. 7 shows schematic representations and cross sections of various structures with one slot or two or more slots (slot A to slot E)
Figure 7:
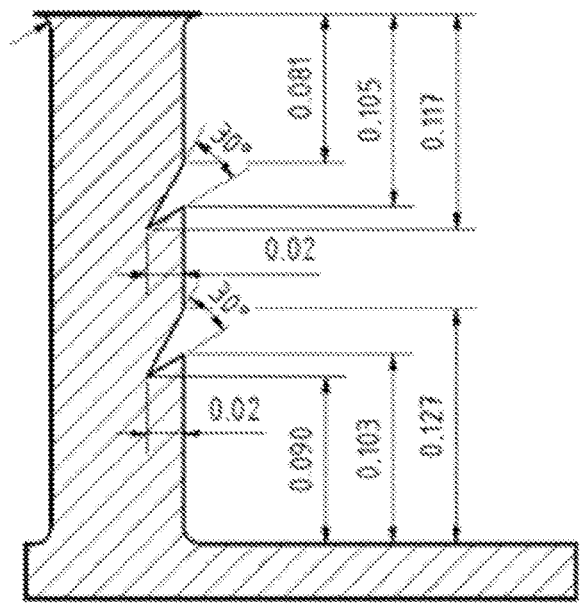
Figure 7:
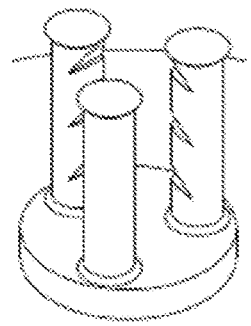
Figure 7:
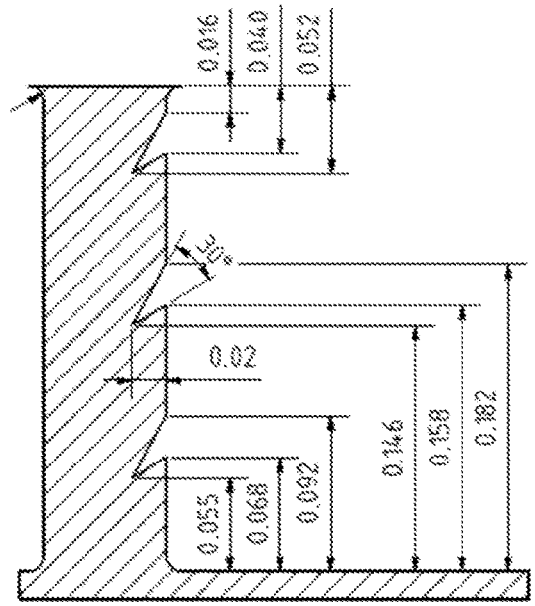
Figure 7:
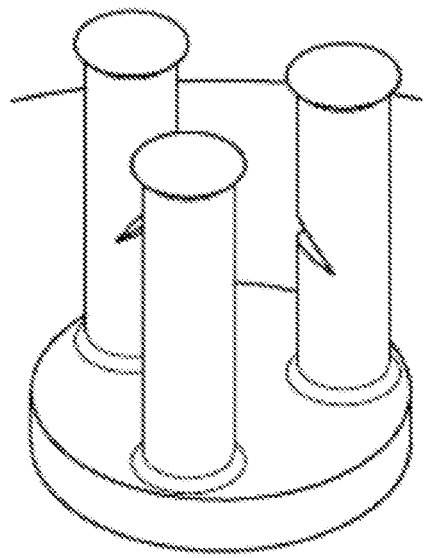
Figure 7:
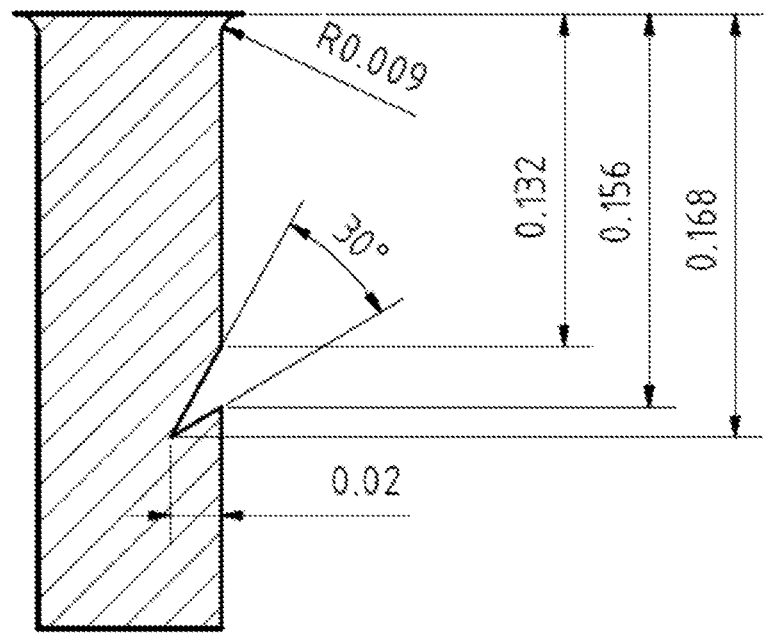
Figure 7:
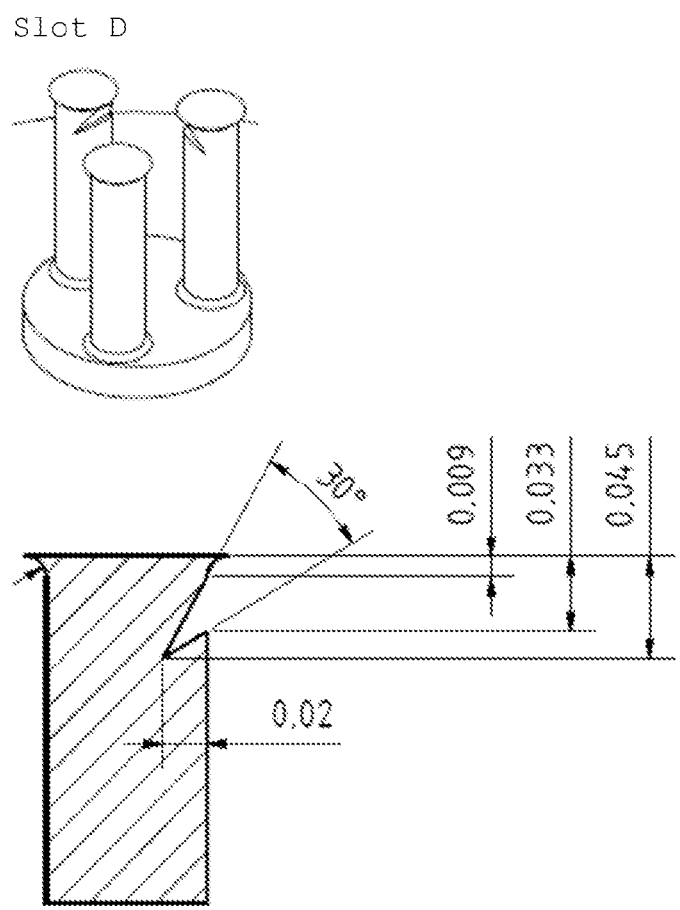
Figure 7:
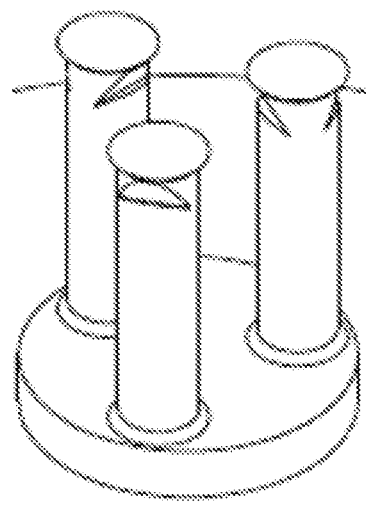
Figure 7:
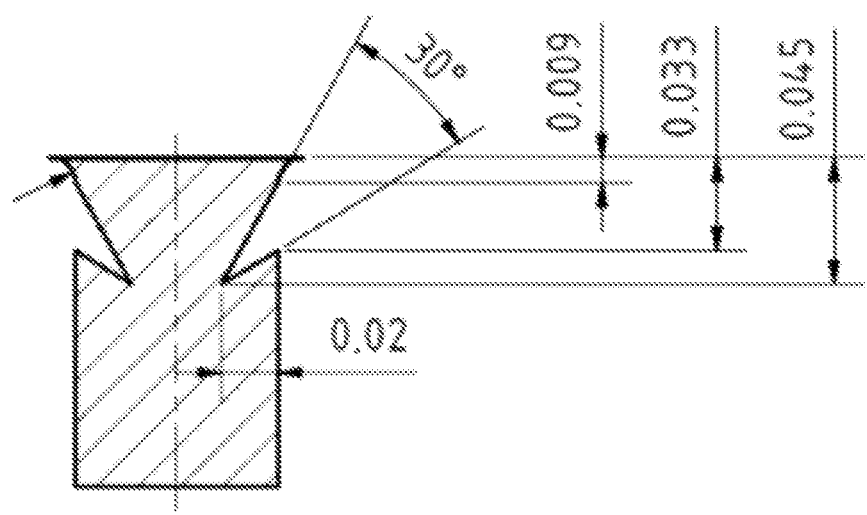

Table 6 shows various structures with slots. Schematic representation and the cross section of the respective structure are shown by FIG. 7. The typical cutting angle is 30°. The positions of the slot are central, near to the contact area (end face), near to the backing layer on both sides of the column. Customarily there may be 1 to 3 slots. They may be arranged on the inside and/or outside.

Figure 8:
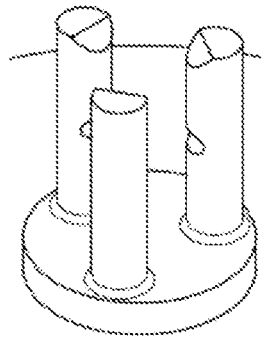
FIG. 8 shows schematic representations of various structures with a corner and a notch, and also a cross section through the corner structure (corner A to corner E)
Figure 8:
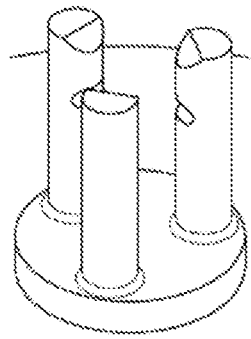
Figure 8:
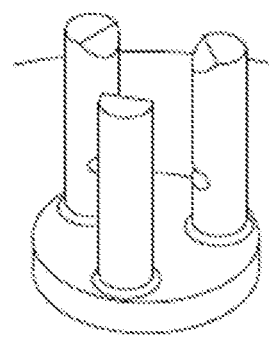
Figure 8:
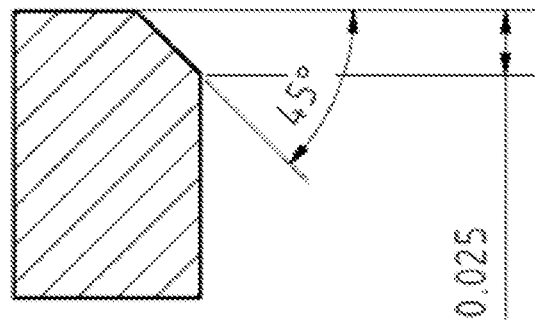
Figure 8:
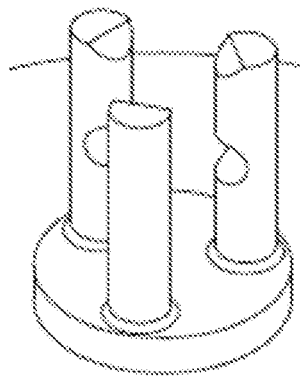
Figure 8:
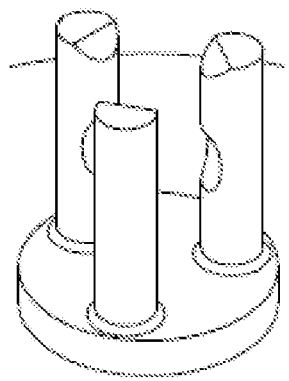

Table 7 and FIG. 8 show structures which have a corner on the end face, and also, as a further structural feature, have a notch. The cross section shown in FIG. 8 shows a cross section through the upper region with the corner. A typical corner angle is 45°. A typical corner dimension is 35% relative to the diameter of the end face without corner (35 μm for a diameter of 100 μm).

Figure 9:
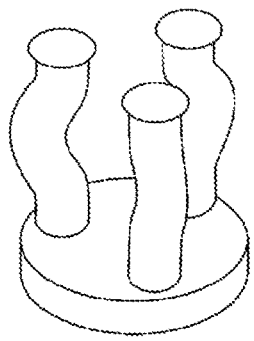
FIG. 9 shows three-dimensional representation and cross section through a structure with curvature (S shape)
Figure 9:
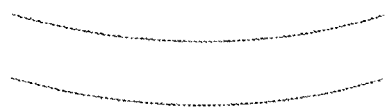
Figure 9:
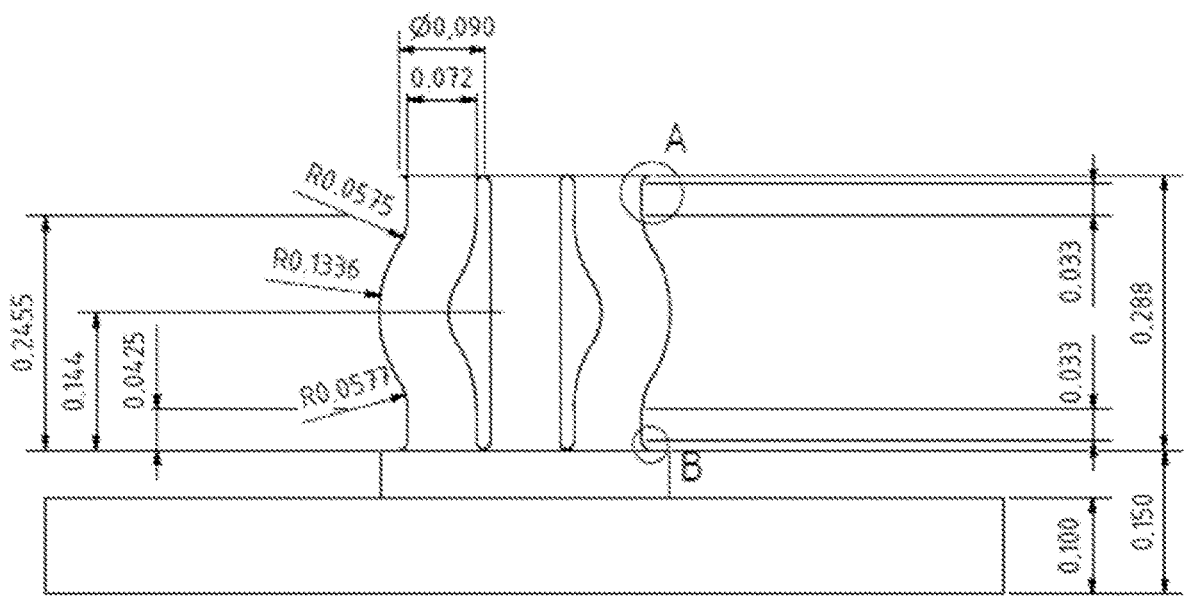

FIG. 9 shows a structure produced of the S type. A typical radius of the flexion is around 134 μm, corresponding to almost half the column height. The figures in the cross section correspond to millimeters.

Figure 10:
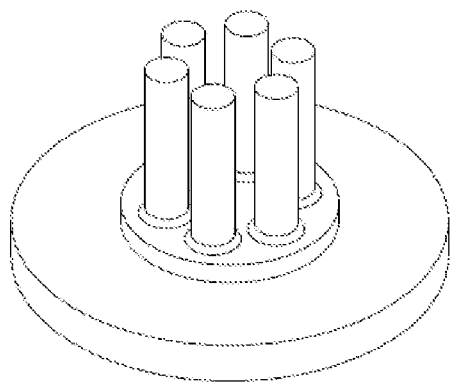
FIG. 10 shows schematic representation of structures with 6 columns, structures, reference F, notch F, corner F and S structure F.
Figure 10:
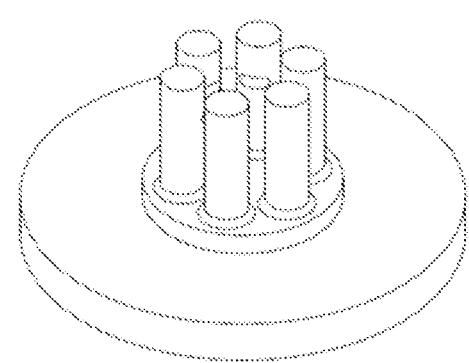
Figure 10:
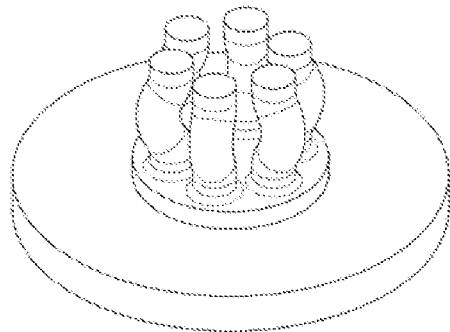
Figure 10:
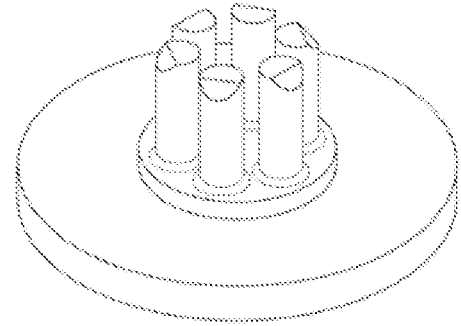

FIG. 10 shows structures each having six columns. The circle diameter on which the center points of the outer columns lie is 300 μm in each case. The dimensions are shown in table 8.

Figure 11:
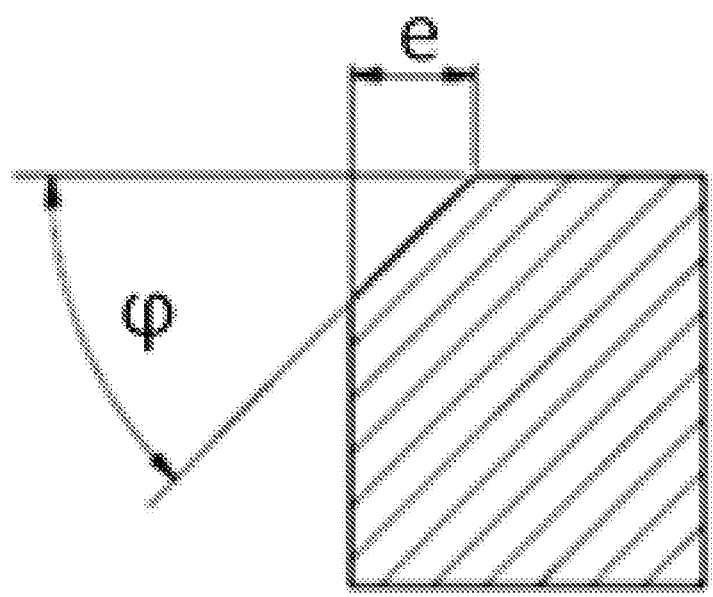
FIG. 11 shows schematic representation of the parameters of the corners.

FIG. 11 shows the definition of the parameters of the different corners (parameters in table 9) for structures based on corner F.

Figure 12:
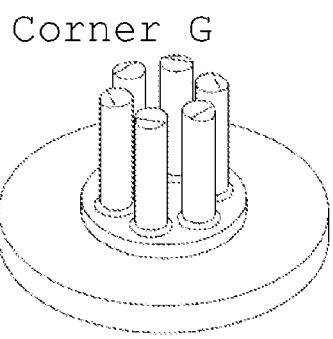
FIG. 12 shows schematic representation of the structures corner G, corner H, corner I, corner J, corner K and corner L.
Figure 12:
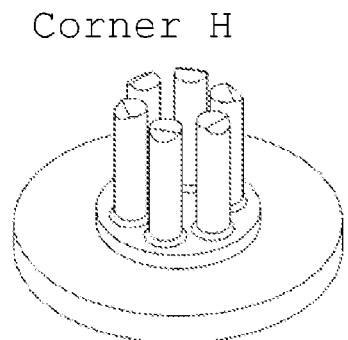
Figure 12:
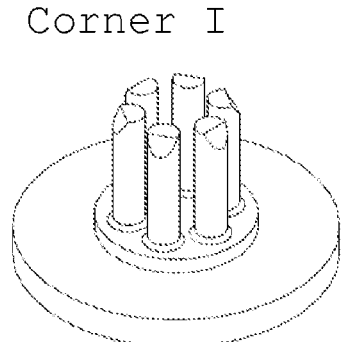
Figure 12:
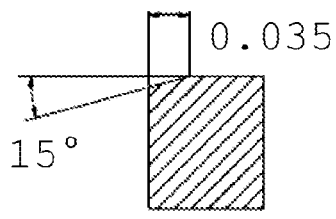
Figure 12:
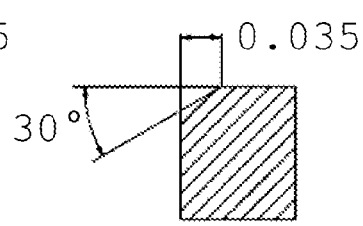
Figure 12:
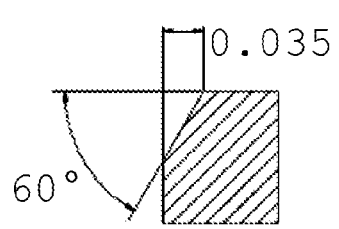
Figure 12:
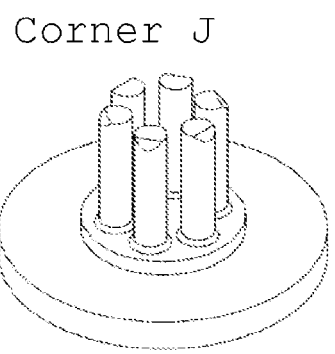
Figure 12:
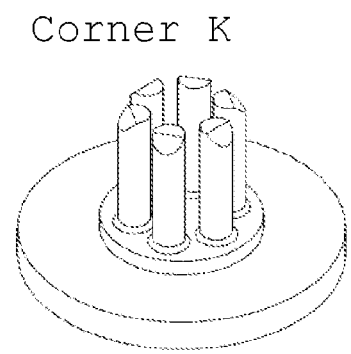
Figure 12:
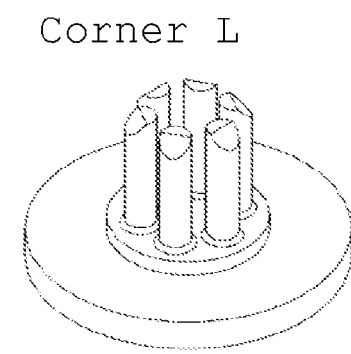
Figure 12:
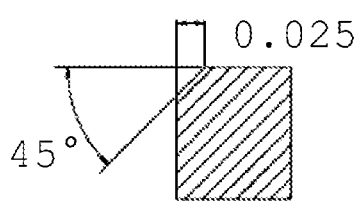
Figure 12:
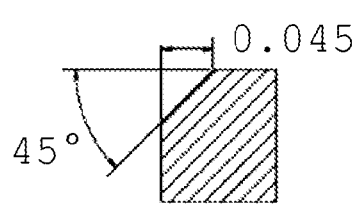
Figure 12:
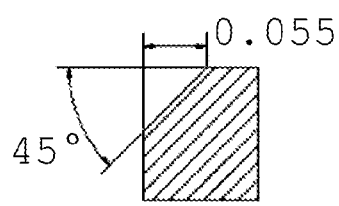

FIG. 12 shows the parameters and schematic representations of the structures corner G to L (parameters in table 9).

Table 10 shows the buckling behavior of different structures. The reference structures A to D always buckle outward or entirely. The results show that the features of the structures influence the buckling behavior, in particular the buckling direction (e.g., internal or external, or centrically inward or outward). Only if the slots are very close on the contact area (slot D) does the structure not buckle outward. In the case of the structures having two or more different features (corner inside, notch inside), the corner dominates the buckling behavior in the case of structures A to C. Only in the case of the notch with larger diameter (D) or oval notch (E) does the notch dominate the buckling behavior. This shows that the radius of the notch determines its influence. With slots in the vicinity of the contact area it might be possible to increase the adaptability of the structures to irregular surfaces.

Figure 13:
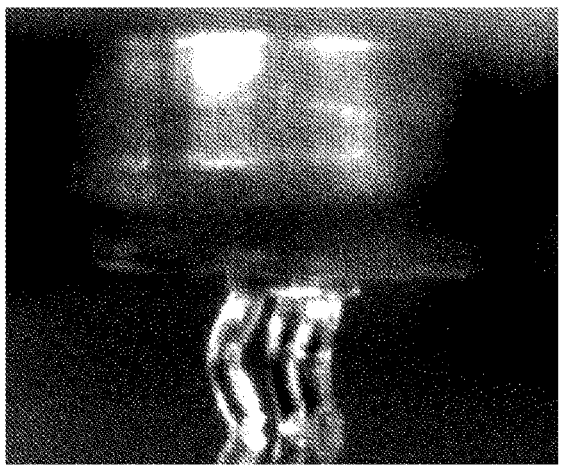
FIG. 13 shows images of structures with Euler buckling.
Figure 13:
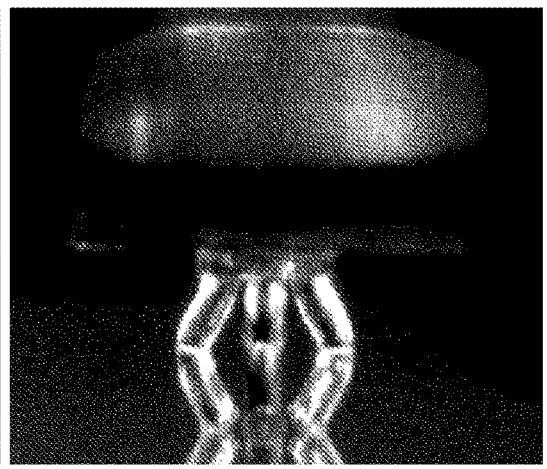
Figure 13:
Figure 13:
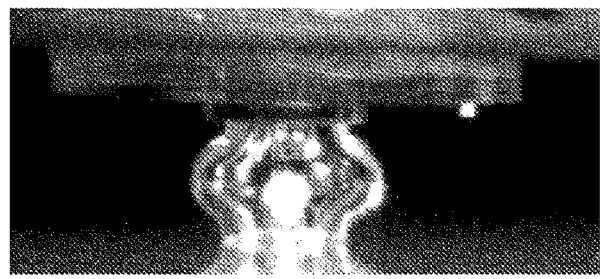

FIG. 13 shows images of various structures on buckling. The reference to structure A buckles unpredictably. The direction is determined by influencing factors such as orientation of the structures to the substrate and quality of the structure. The notch structure A deliberately buckles outward relative to the center point of the structure. This reduces the contact area of the end face that is available for adhesion. The notch structure B with the larger notch radius buckles to an ever greater extent. This reduces the contact area to an even greater extent.

The adhesion is weakened to an even greater extent. The S structure A buckles outward in accordance with the predefined shape.

The buckling behavior of the notch structures with offset caps (inside or outside) is always dominated by the notch. The 2×3 structures as well buckle selectively outward in accordance with their arrangement of the notches.

Figure 14:
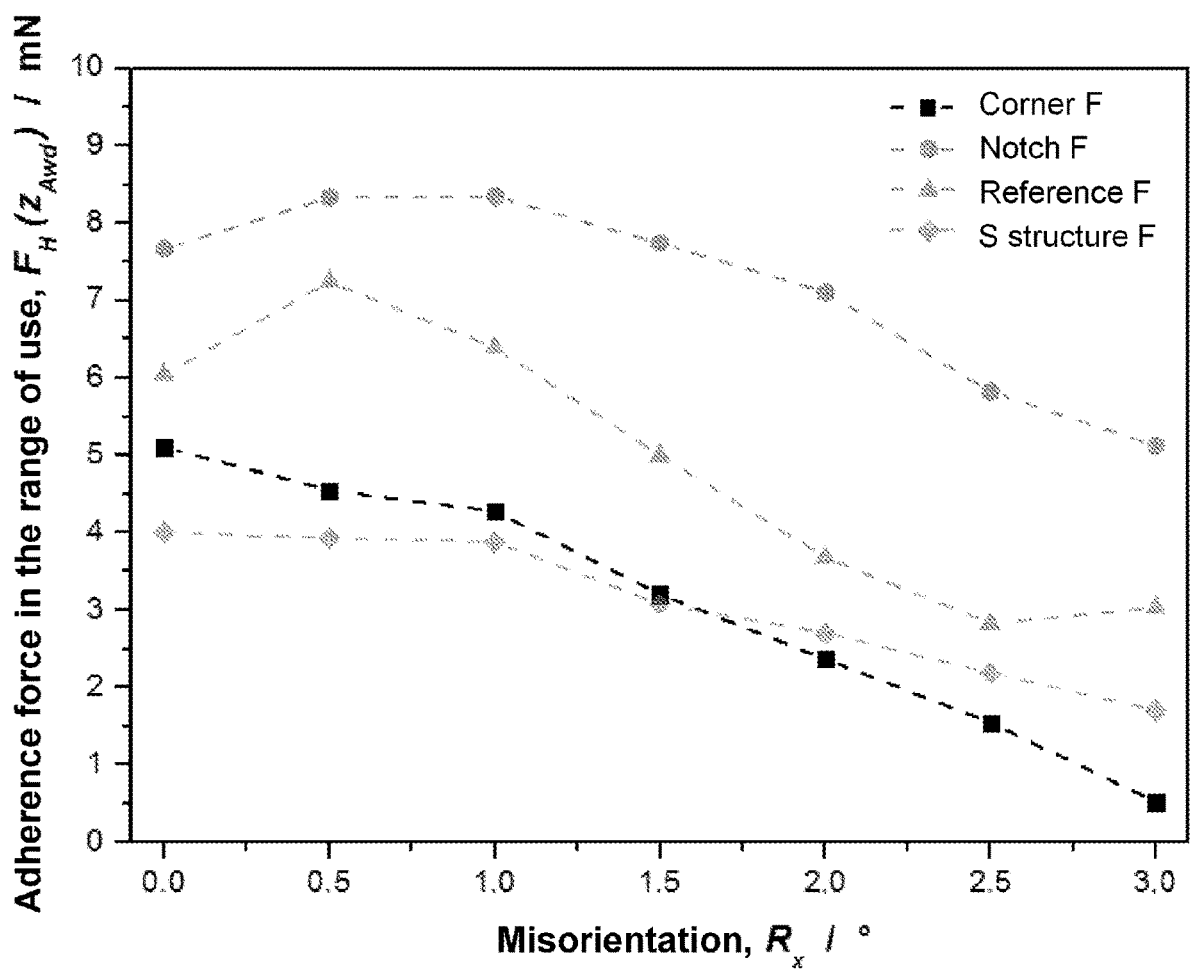
FIG. 14 shows measurement of the adherence force ($F_H$) for a compression of 25% as a function of a misorientation in x-direction for various samples.

For the structures F, the influence of a tilting in x-direction on the adherence force and the buckling behavior was measured. For all structures, the adherence force decreases up to a tilting angle of 3°. The structure reference F buckles entirely in one direction in accordance with the tilt direction. The other structures (notch F, corner F and S structure F) always buckle centrically outward. The decrease in the adherence force is smaller in the case of the notch structure than in the case of the other structures (FIG. 14; adherence force ($F_H$), compression force ($F_r$)).

Figure 15:
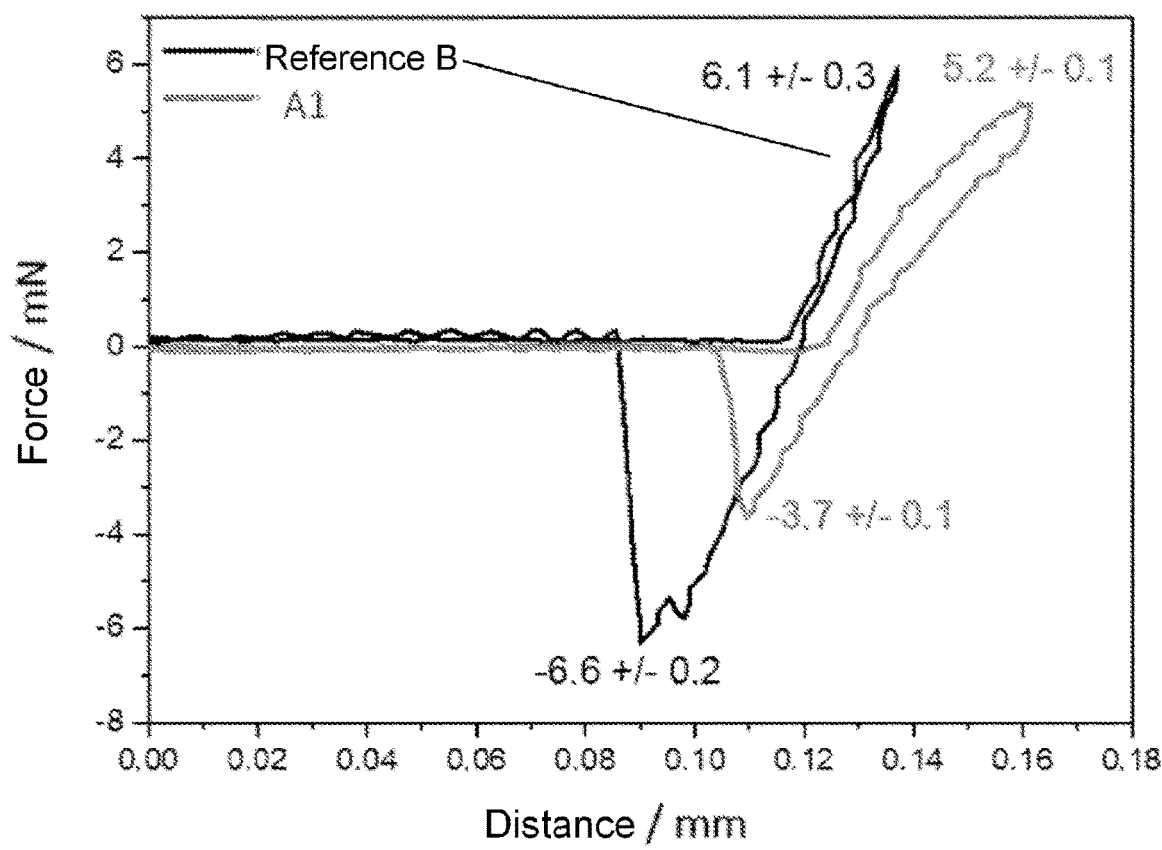
FIG. 15 shows adhesion measurements on different samples a) 250 mN force measuring sensor, velocity: 100 μm/s; reference B and A1; b) 2 N force measuring sensor, velocity 5 μm/s; no hold time on contact with the substrate; compression force 500 μN.
Figure 15:
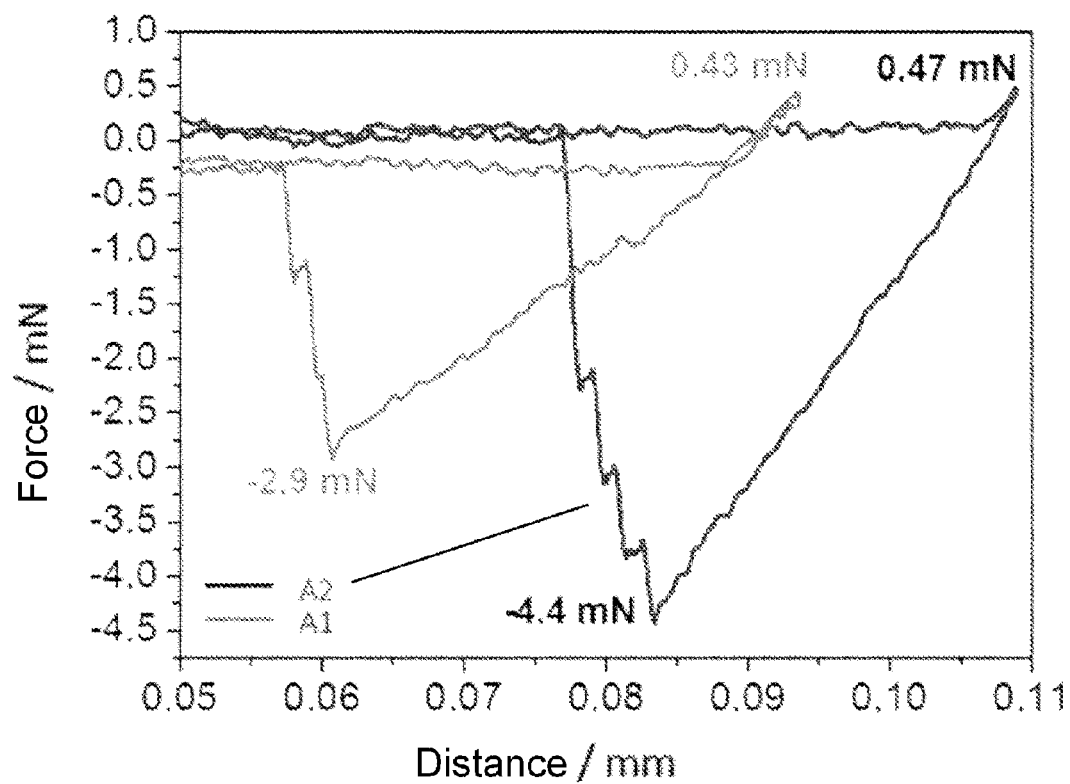

FIG. 15 shows the influence of the curvature of the S structure A1 on the adhesion force (FIGS. 15 a) and b)). For the same contact area, lower adhesion forces are measured with the bent structures (A1) for a comparable pressing force. This is advantageous for the detachment of lightweight components.

Figure 16:
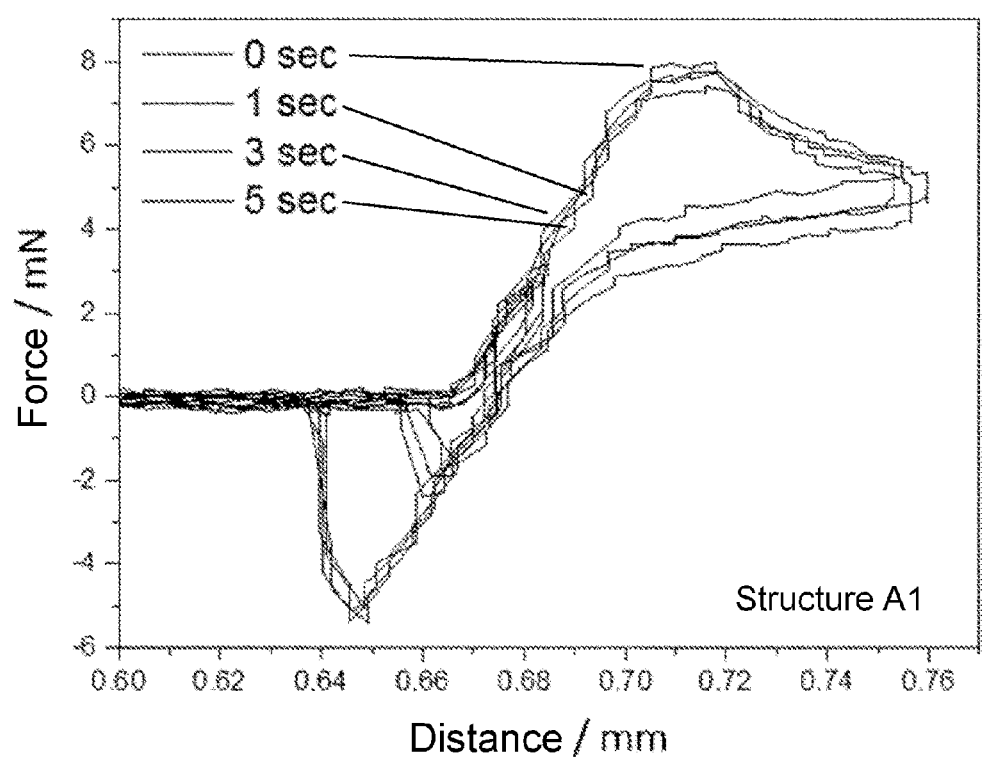
FIG. 16 shows force-displacement diagram for structure A2 (*a*) and A1 (*b*) measured with 2N force measuring sensor, velocity 10 μm/s.
Figure 16:
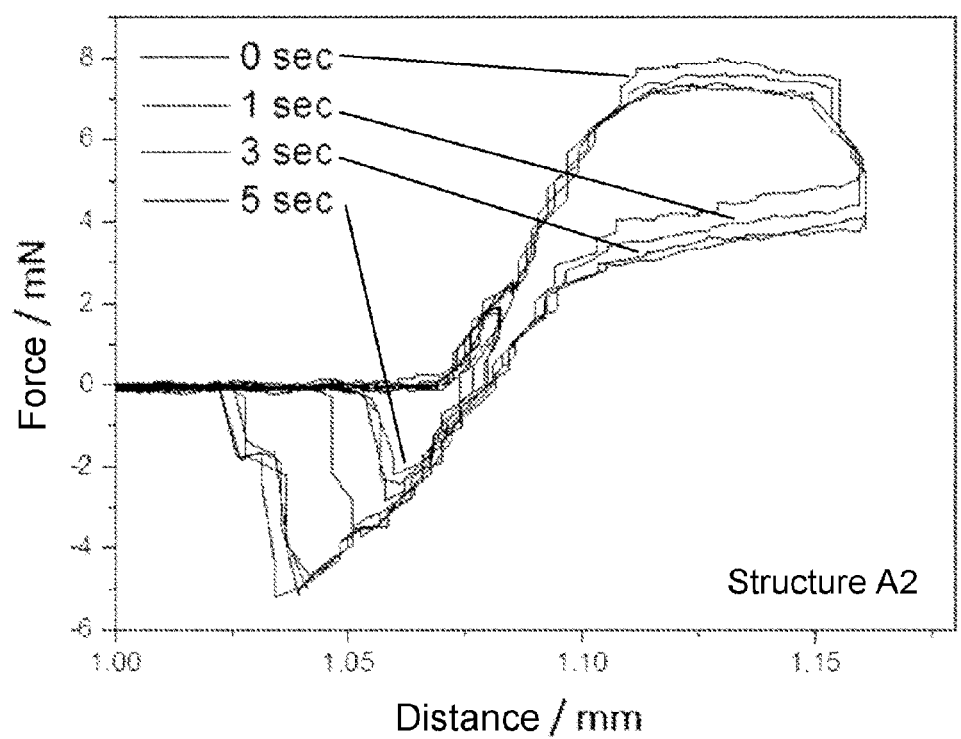

From FIG. 16 it is evident that the structure A2 has an altered force-displacement profile in comparison to the structure A1. With the structure A1 there is no drop in force (drop in the pressing force) through buckling of the columns.

Similar results were measured for the structures from FIG. 4. The adhesion force is still constant even after 10 cycles. Moreover, the adhesion force also rises with increasing detachment velocity, provided no buckling has as yet been obtained in the structures.

Figure 17:
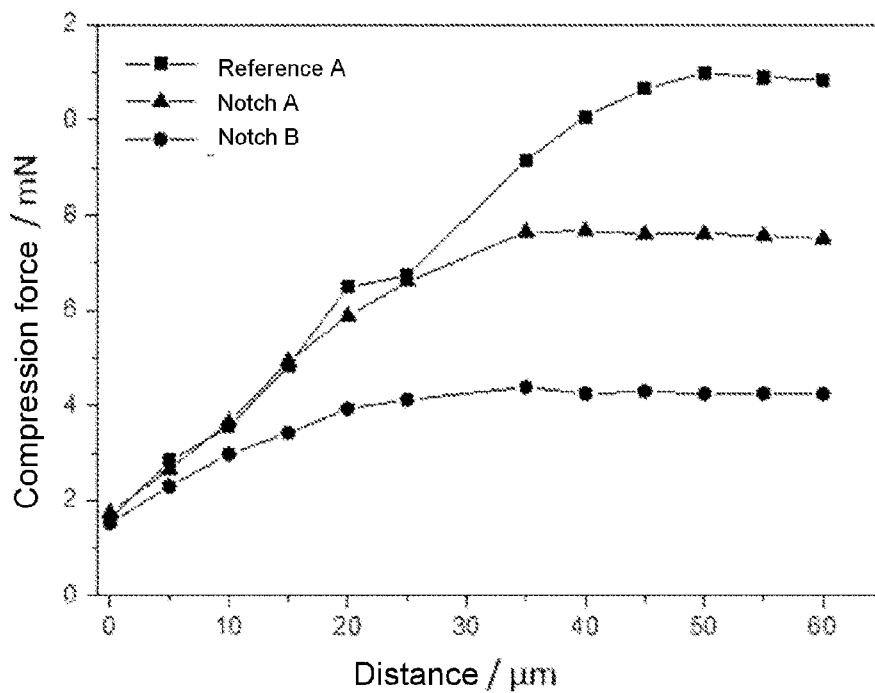
FIG. 17 shows measurement of the pressing force as a function of the distance for reference A, notch A, notch B, 250 mN force measuring sensor; velocity 100 μm/s.

FIG. 17 shows the influence of the notch radius on the pressing force. With increasing notch radius, the columns buckle earlier and the maximum pressing force is reduced. This is an advantage for automated operations, which are consequently not required to be advanced as precisely up to sensitive components.

Figure 18:
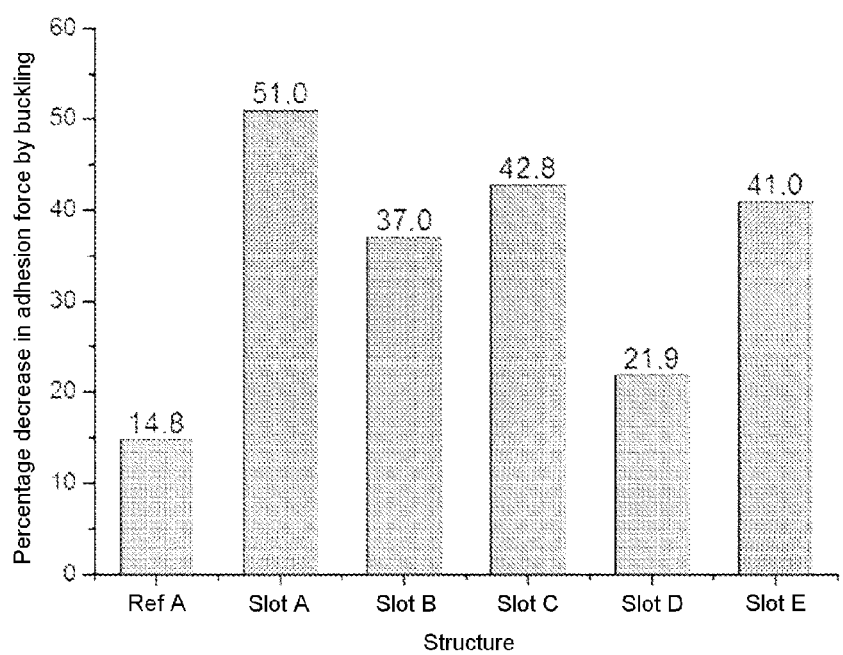
FIG. 18 shows percentage decrease in the adhesion force of various structures (reference A and slotted structures) on compression of 15% (250 mN force measuring sensor, velocity 10 μm/s)

FIG. 18 shows the reduction in the adhesion force at 15% compression (visual buckling, but no loss of contact area). Hence the adhesion force can be lowered by 20-50% for a pressing force of 5 mN, but only around 15% in the case of reference A (FIG. 18). The adhesion force increases by 30-40% with increasing detachment velocity (5-100 μm/s). In the non-buckled state, the hold time (0-10 seconds) has no influence on the adhesion force. At 15% compression, the hold time (0-10 seconds) likewise has no influence on the adhesion force.

Figure 19:
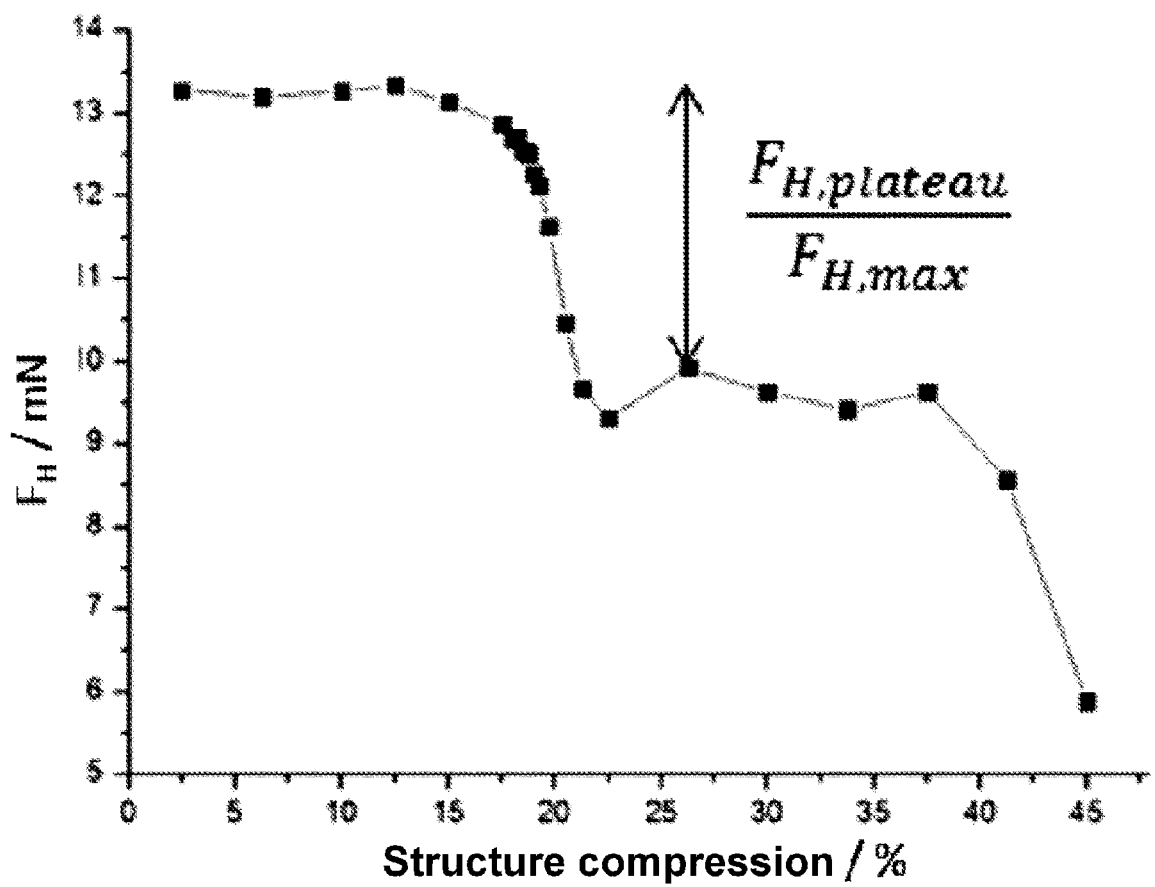
FIG. 19 shows adherence force profile as a function of the compression for the structure reference F.

FIG. 19 shows a typical adherence force profile as a function of the compression. With increasing compression, there is an upper plateau, a drop in force, a lower plateau and a further drop in force apparent. Particularly preferred are structures having a compression of 25% for a reduced adherence force. This allows the detachment even of sensitive objects. The first plateau is an effect of the buckling. With the second plateau the columns are strongly viscoelastically deformed, and so on removal the contact area can no longer be brought completely into contact and, as a result, the adherence force is reduced.

Figure 20:
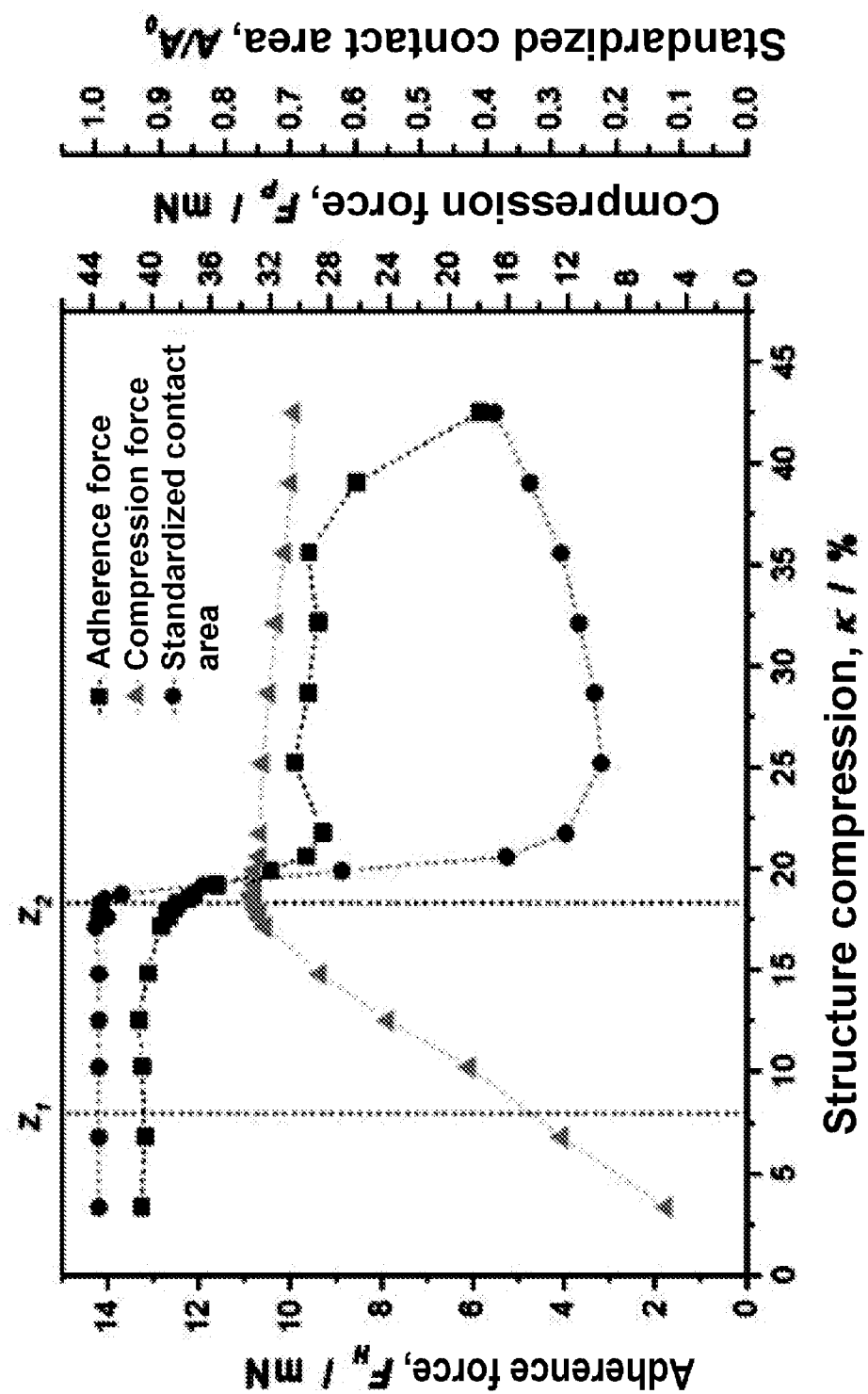
FIG. 20 shows measuring series for the structure reference F for adherence force ($F_H$), pressing force ($F_r$) and standardized contact area at the transition from advance and removal (A/A$_0$), 250 mN force measuring sensor, advancing and retreating velocity 10 μm/s, no hold times on contact, waiting time between each measurement 3 minutes.

FIG. 20 shows a measuring series for the determination of the adherence forces at different pressing force (2.5% compression to 45% compression) for structure reference F. For each compression, a new measurement was carried out, and for this the adherence force $F_H$, the pressing force $F_P$ and the contact area at the transition between advancing and removal were evaluated. Here, $F_{H,Pt}$ stands for the adherence force at a compression of 25%; $F_{H,max}$ for the maximum adherence force, and K for a compression.

Visual buckling occurs at $z_1 \approx 7.5\%$ and reduction of the contact area by peeling of the structure occurs at $z_2 \approx 18.75\%$. The maximum possible compression force is $F_{P,max} \approx 33.3$ mN and is attained at a compression of $K(F_{P,max}) \approx 19.25\%$. The maximum adherence force is $F_{H,max} \approx 13.3$ mN and is attained at a compression of $K(F_{H,max}) \approx 12.5\%$. The contact area decreases as a result of the buckling and peeling by a maximum of 77.6% ($A_{min} \approx 22.4\%$). On a percentage basis, the adherence force can be lowered by the buckling to $F_{H,min} = 44\%$ relative to the maximum adherence force.

Figure 21:
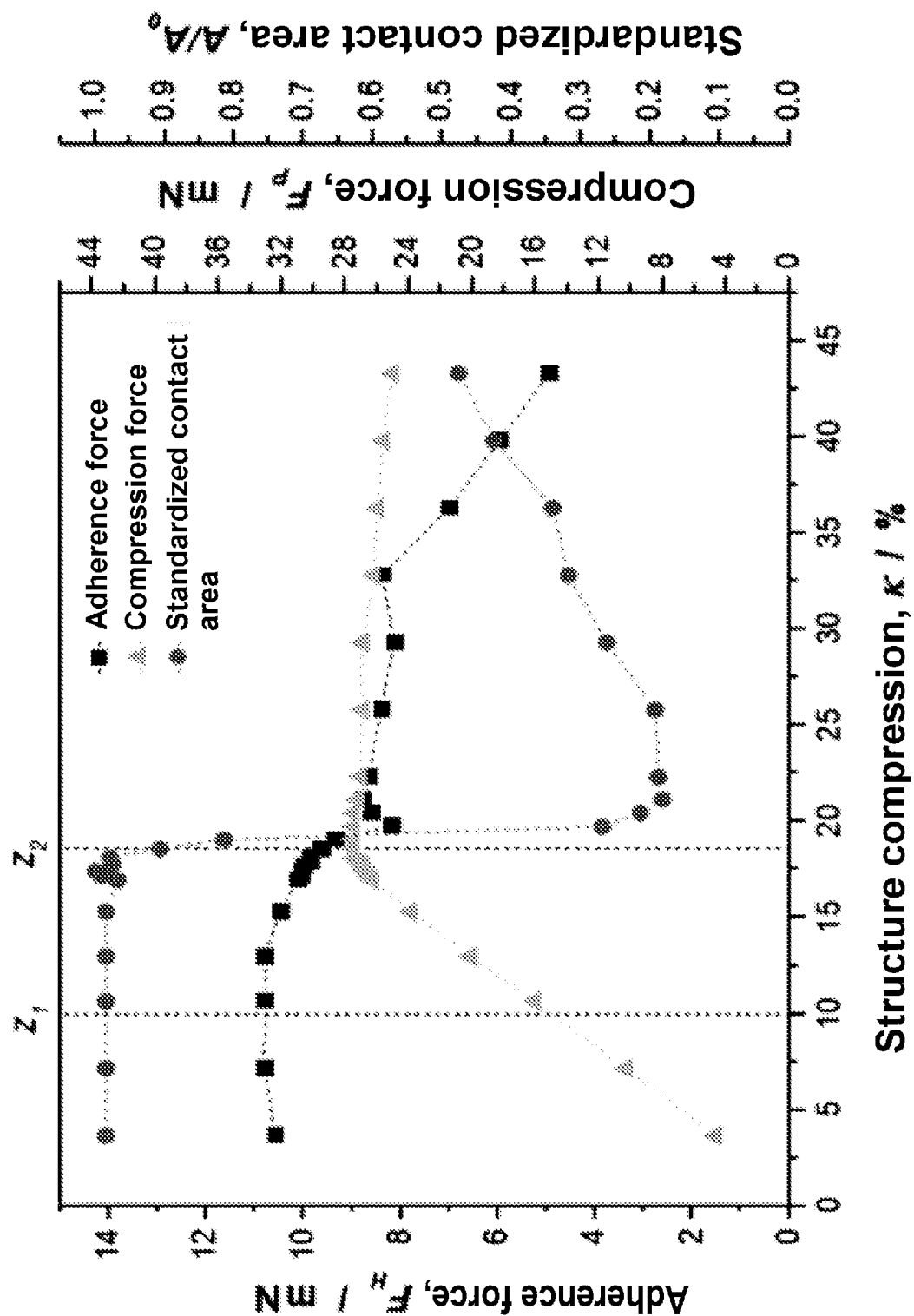
FIG. 21 shows measuring series like FIG. 20 for the structure notch F.

FIG. 21 shows a measuring series for the determination of the adherence forces at different pressing forces (2.5% compression to 45% compression) for structure notch F. For each compression, a new measurement was carried out, and for this the adherence force $F_H$, the pressing force $F_P$ and the contact area at the transition between advancing and removal were evaluated.

Visual buckling occurs at $z_1 \approx 9.25\%$. Start of peeling occurs at $z_2 \approx 18.5\%$. The maximum compression force is $F_{P,max} \approx 27.6$ mN and is attained at a compression of $K(F_{P,max}) \approx 19.0\%$. The maximum adherence force is $F_{H,max} \approx 10.8$ mN and is attained at a compression of $K(F_{H,max}) \approx 6.25\%$. The contact area decreases as a result of the buckling and peeling by a maximum of 81.7% ($A_{min} \approx 18.3\%$). On a percentage basis, the adherence force can be lowered by the buckling to $F_{H,min} = 45.8\%$ relative to the maximum adherence force.

In comparison to the reference structure, no earlier buckling was observed. Reduced compression forces and reduced adherence forces were measured.

Figure 22:
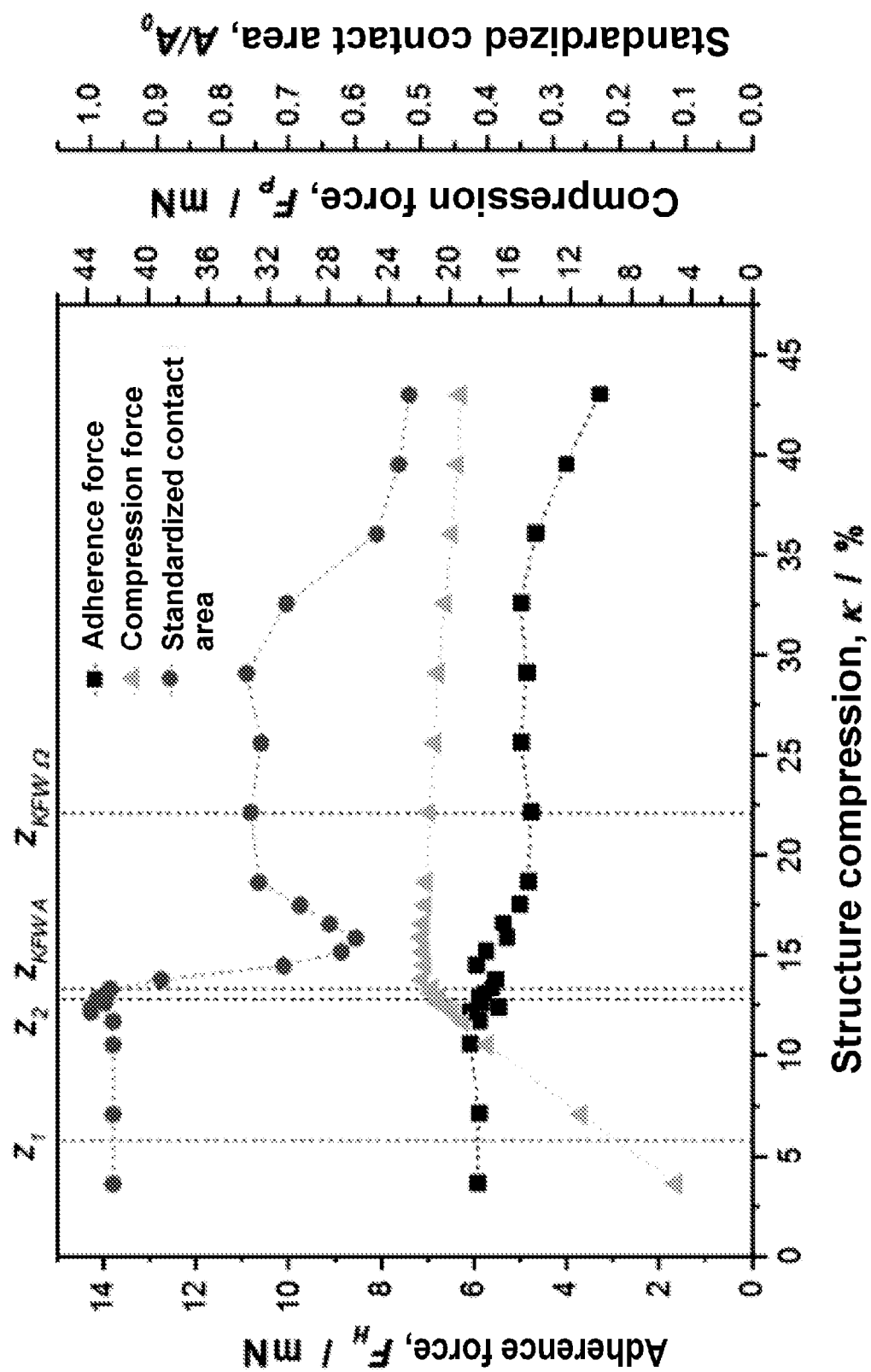
FIG. 22 shows measuring series like FIG. 20 for the structure corner F.

FIG. 22 shows a measuring series for the determination of the adherence forces at different pressing force (2.5% compression to 45% compression) for structure corner F. For each compression, a new measurement was carried out, and for this the adherence force $F_H$, the pressing force $F_P$ and the contact area at the transition between advancing and removal were evaluated.

Visual buckling occurs at $z_1 \approx 4.75\%$. Start of peeling occurs at $z_2 \approx 12.5\%$. The maximum possible compression force is $F_{P,max} \approx 21.9$ mN and occurs at a compression of $K(F_{P,max}) \approx 15.75\%$. The maximum adherence force is $F_{H,max} \approx 6.1$ mN and occurs at a compression of $K(F_{H,max}) \approx 11.75\%$. On a percentage basis, the adherence force can be lowered by the buckling to $F_{H,min} = 54.2\%$. The contact areas switch in a compression range from $z_{KFW,A} \approx 13.0\%$ to $z_{KFW,\Omega} \approx 22.5\%$. The contact area decreases by a maximum of 48.1% ($A_{min} \approx 51.9\%$).

The structure buckles early. Compression force in the range of use is reduced by around 35%. The adherence force in the range of use is reduced by around 50%.

Figure 23:
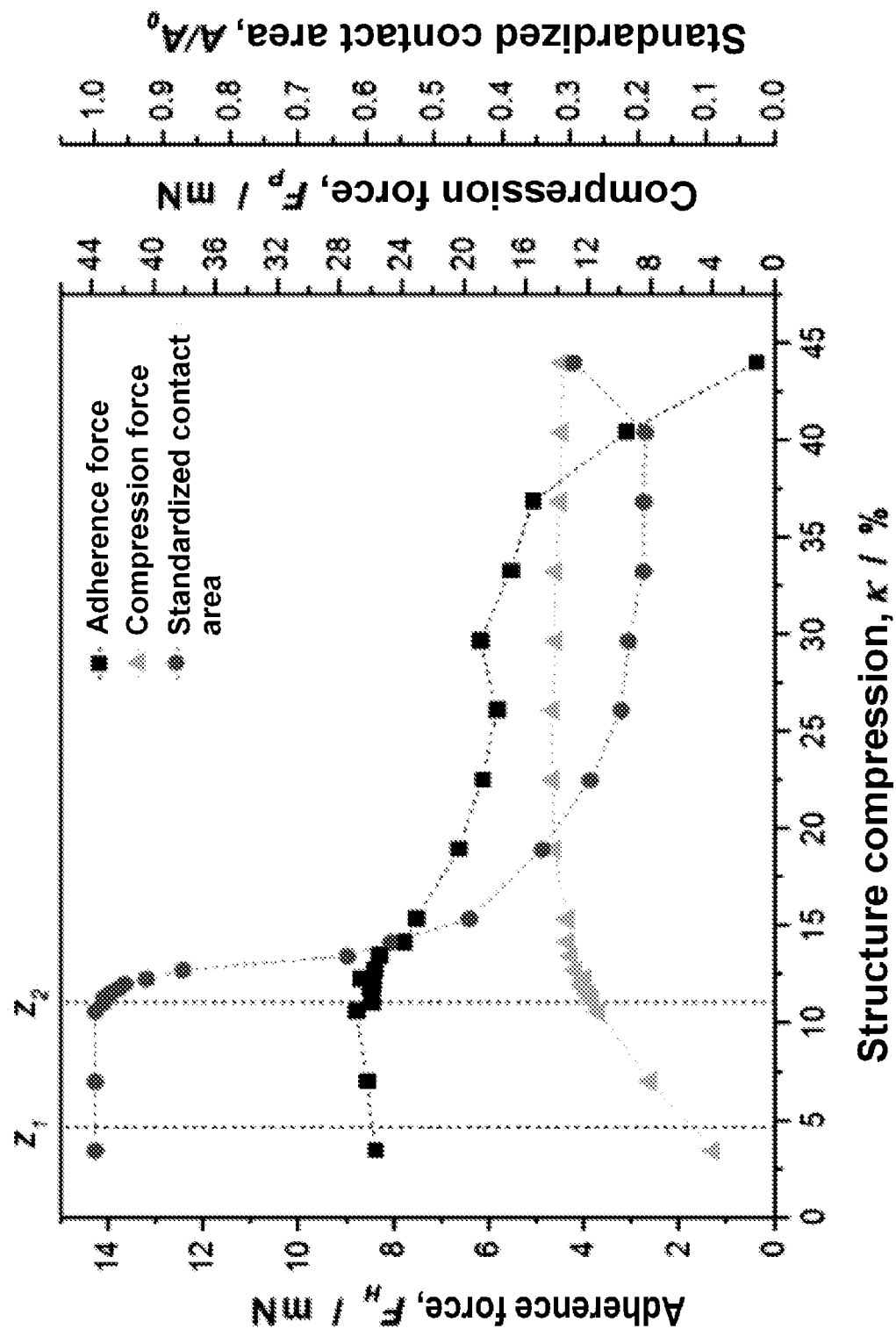
FIG. 23 shows measuring series like FIG. 20 for the S structure F.

FIG. 23 shows a measuring series for the determination of the adherence forces at different pressing forces (2.5% compression to 45% compression) for S structure F. For each compression, a new measurement was carried out, and for this the adherence force $F_H$, the pressing force $F_P$ and the contact area at the transition between advancing and removal were evaluated.

Visual buckling occurs at a compression of $K(z_1)$ 3.75%. Start of peeling occurs at a compression of $K(z_2)$ 10.5%. The maximum compression force is $F_{P,max} \approx 14.3$ mN and occurs at a compression of $K(F_{P,max}) \approx 22.5\%$. The maximum adherence force is $F_{H,max}$ 8.8 mN and is attained at a compression of $K(F_{H,max}) \approx 10.0\%$. The contact area decreases by a maximum of 81% ($A_{min} \approx 19.0\%$). On a percentage basis, the adherence force can be lowered to $F_{H,min} = 4.5\%$ of the maximum adherence force.

In comparison to the reference structure, the structure buckles early. The compression force is reduced in the range of use by around 55%. The adherence force in the range of use is reduced by around 40%.

Figure 24:
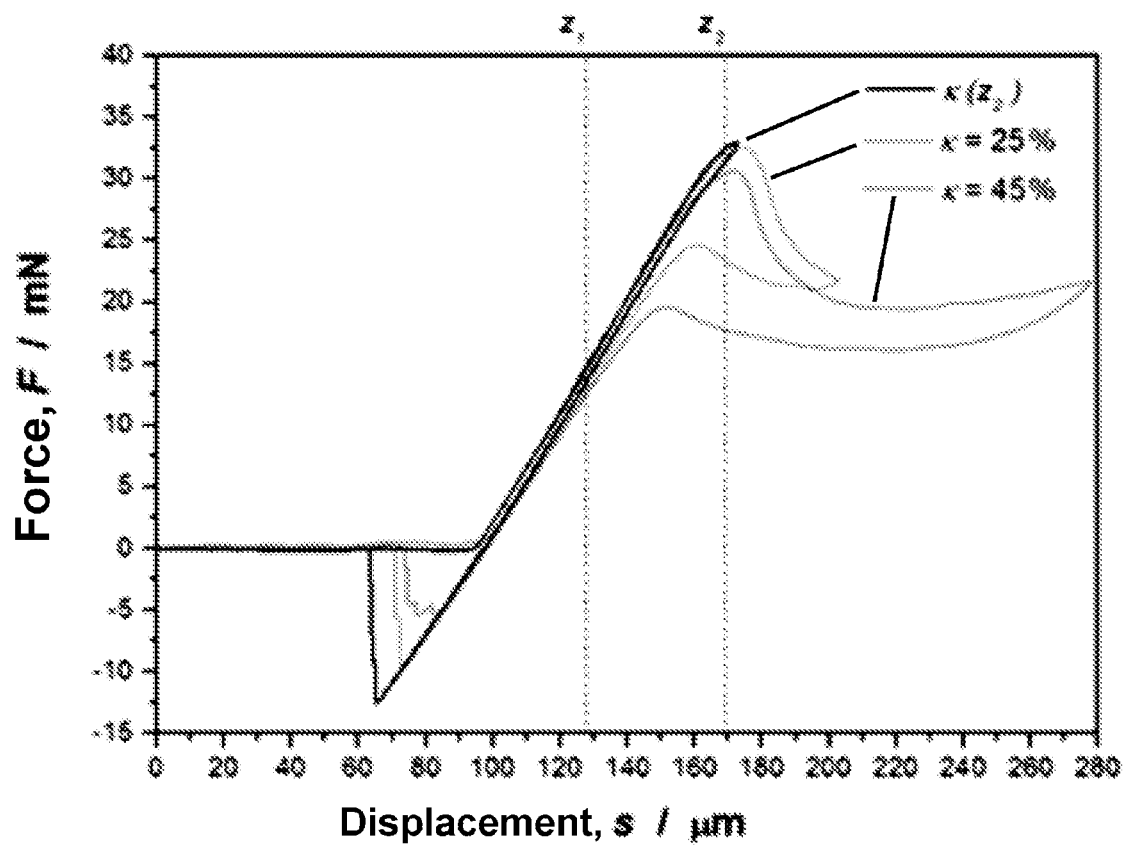
FIG. 24 shows force-displacement diagrams for the structures a) reference F, b) notch F for compressions of 10%, 25% and 45%.
Figure 24:
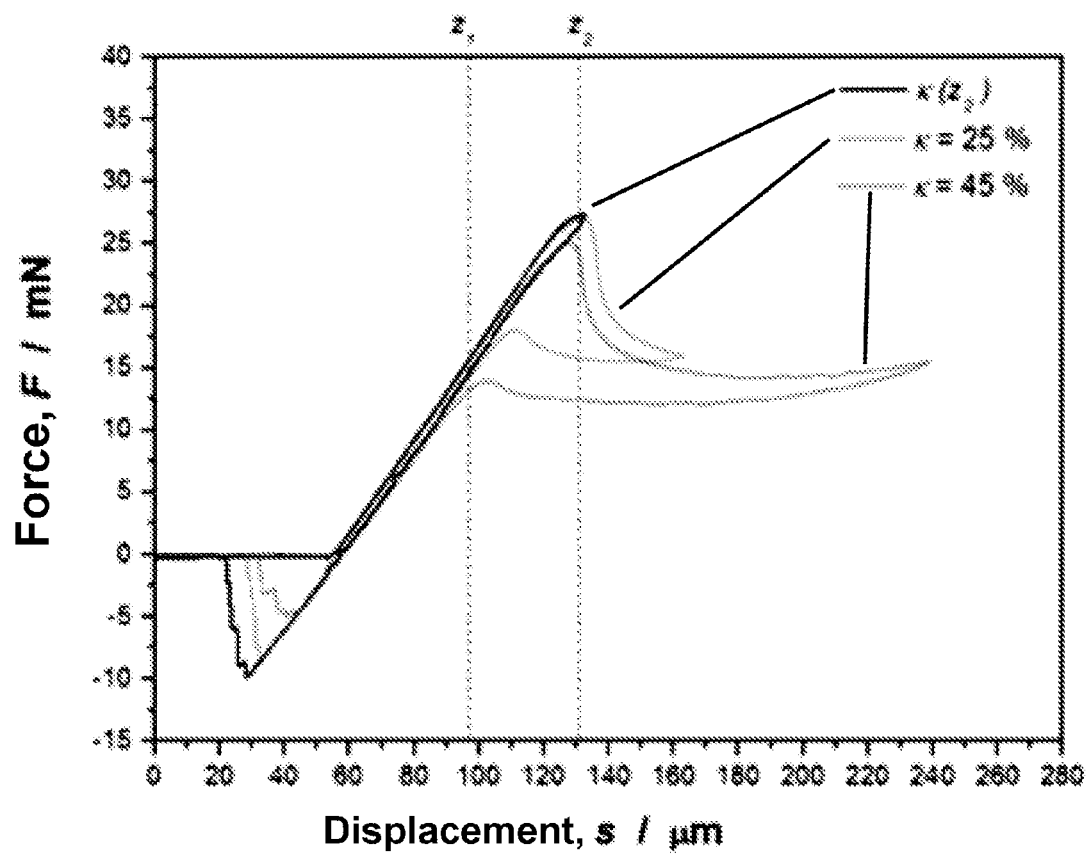
Figure 25:
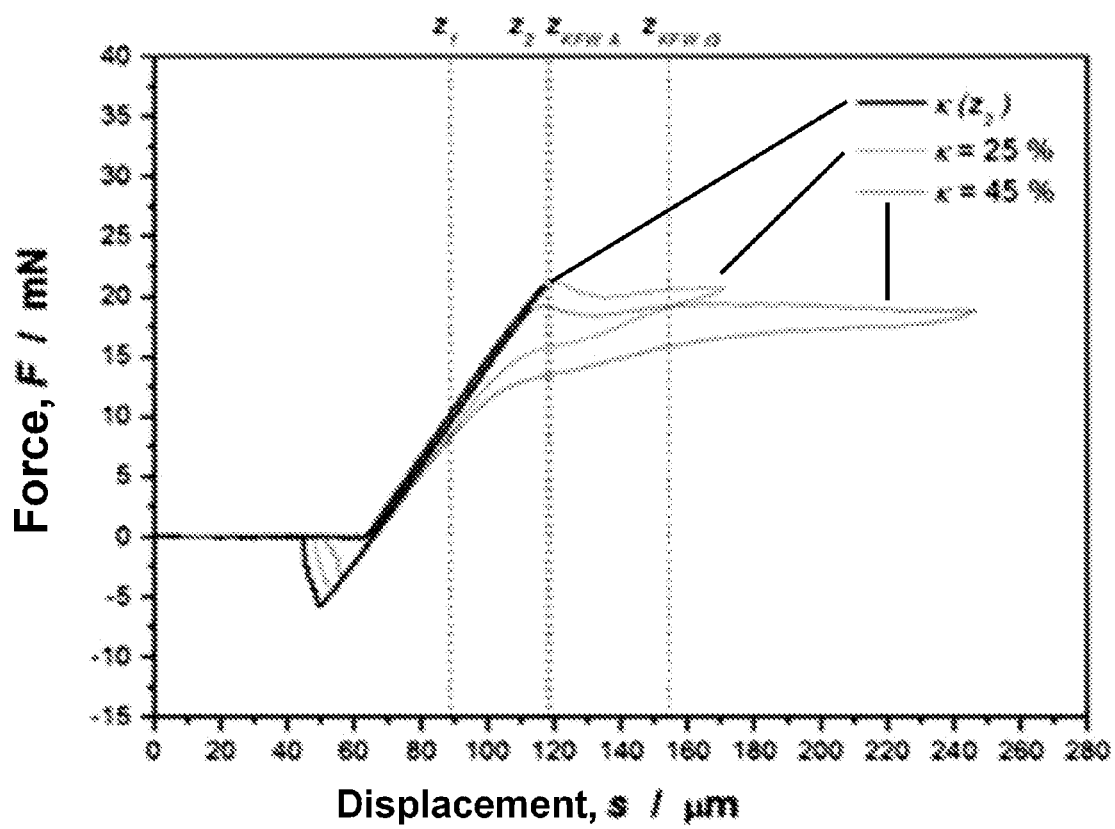
FIG. 25 shows force-displacement diagrams for the structures a) corner F, b) S structure F for compressions of 10%, 25% and 45%.
Figure 25:
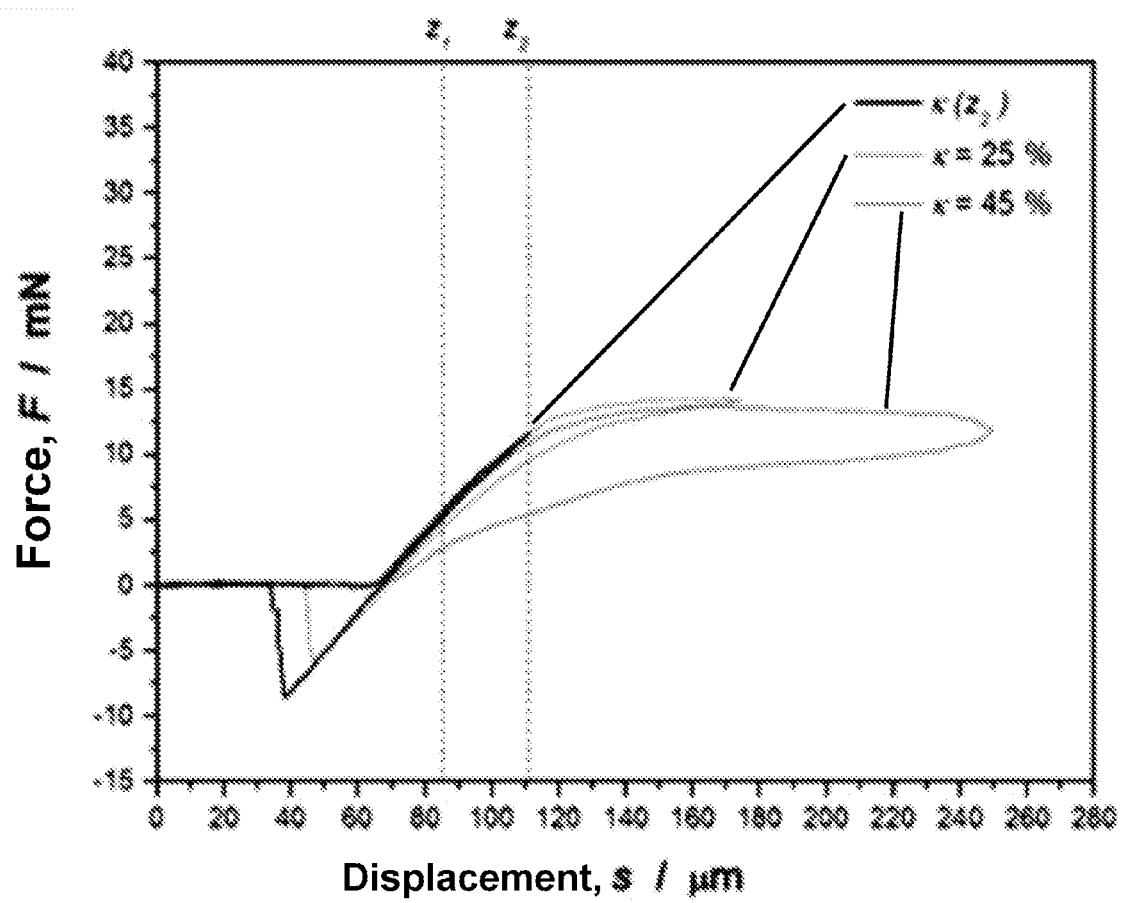

FIGS. 24 and 25 show force-displacement diagrams for various structures.

FIGS. 26 and 27 show the dependency relationship between the adherence force and the detachment velocity.

FIG. 28 shows a measuring series in which the corner angle of a structure was varied from 15° to 60°. The corner dimension was kept constant (table 9). Large corner angles are the most advantageous, since in this case the buckling begins at the lowest compressions, the maximum compression force is the lowest, and the adherence force drops the greatest. The best structure from this measuring series, structure I, however, does not exhibit any massive improvement in comparison to the structure F.

FIG. 29 shows a measuring series in which the corner dimension of a structure was varied from 25 µm to 55 µm. The corner angle was kept constant (table 9). Corner dimensions in the range of 35-45% of the pillar diameter are the most advantageous, since here the buckling begins at the lowest compressions, the maximum compression force is the lowest, and the adherence force drops the greatest. The best structure from this measuring series, structure K, again shows an improvement in comparison to the structure F.

TABLE 1

| Type | A1 (FIG. 1) | A2 (FIG. 1) | A3 (FIG. 2) | A4 (FIG. 2) | A5 (FIG. 2) | A6 (FIG. 3) | A7 (FIG. 3) |
|---|---|---|---|---|---|---|---|
| Diameter of Backing Layer 1 [µm] | 1000 | 1000 | 1000 | 1000 | 1000 | 1000 | 1000 |
| Thickness of Backing Layer 1 [µm] | 100 | 100 | 100 | 100 | 100 | 100 | 100 |
| Diameter of Backing Layer 2 [µm] | 300 | 300 | 300 | 300 | 300 | 300 | 300 |
| Thickness of Backing Layer 2 [µm] | 50 | 50 | 50 | 50 | 50 | 50 | 50 |
| Height of column [µm] | 288 | 288 | 288 | 288 | 288 | 288 | 288 |
| Diameter of column [µm] | 72 | 72 | 72 | 72 | 72 | 72 | 72 |
| Diameter of caps [µm] | 90 | 90 | 90 | 90 | 90 | 90 | 90 |

TABLE 2

| Type | A1 (FIG. 1) | A2 (FIG. 1) | A3 (FIG. 2) | A4 (FIG. 2) | A5 (FIG. 2) | A6 (FIG. 3) | A7 (FIG. 3) |
|---|---|---|---|---|---|---|---|
| Feature | Protrusion at half column height | Notching at half height oriented inward; Caps offset outward | Notching at half height inside; Caps offset inward | Notching at half height; Caps offset outward | Notching at half height; Caps offset inward | Notching at half height; Caps offset outward | Notching at half height; Caps offset outward |

TABLE 3

| Type | 2 × 3 with notches (FIG. 4) | 2 × 3 without notches (FIG. 4) |
|---|---|---|
| Diameter of round backing layer [μm] | 1000 | 1000 |
| Thickness of round backing layer 1 [μm] | 100 | 100 |
| Length of rectangular backing layer [μm] | 320 | 320 |
| Width of rectangular backing layer [μm] | 570 | 570 |
| Thickness of rectangular backing layer [μm] | 50 | 50 |
| Height of column | 307.2 | 307.2 |
| Diameter of column | 76.8 | 76.8 |
| Diameter of caps | 96 | 96 |
| Feature | Notching at half height with a diameter of 15.36 μm | — |

TABLE 4

| Reference structure | A (FIG. 5) | B (FIG. 5) | C (FIG. 5) | D (FIG. 5) | E (FIG. 5) |
|---|---|---|---|---|---|
| Structure | 3 columns | 5 columns | 3 columns | 5 columns | 3 columns |
| Diameter of Backing Layer 1 [μm] | 1000 | 1000 | 1000 | 1000 | 1000 |
| Thickness of Backing Layer 1 [μm] | 100 | 100 | 100 | 100 | 100 |
| Diameter of Backing Layer 2 [μm] | 300 | 300 | 300 | 300 | 300 |
| Thickness of Backing Layer 2 [μm] | 50 | 50 | 50 | 50 | 50 |
| Height of column [μm] | 288 | 288 | 288 | 288 | 288 |
| Diameter of column [μm] | 72 | 72 | 72 | 72 | 72 |
| Diameter of caps [μm] | 90 | 90 | — | — | — |
| Feature | — | — | — | — | With 45° corner |

TABLE 5

| Notch (notch structure) | A (FIG. 6) | B (FIG. 6) | C (FIG. 6) | D (FIG. 6) | E (FIG. 6) |
|---|---|---|---|---|---|
| Dimensions according to reference structure | A | A | A | A | A |
| Notch | Diameter 14.4 μm | Oval notch | Diameter 28.8 μm | Diameter 14.4 μm | Diameter 14.4 μm |
| Notch position | Central | Central | Central | Near contact area | Near Backing Layer |

TABLE 6

| Slot | A (FIG. 7) | B (FIG. 7) | C (FIG. 7) | D (FIG. 7) | E (FIG. 7) |
|---|---|---|---|---|---|
| Dimensions according to reference structure | A | A | A | A | A |
| Number of slots | 2 | 3 | 1 | 1 | 1 |
| Slot opening angle | 30° | 30° | 30° | 30° | 30° |
| Slot position | Central, inside | Central, inside | Central, inside | Near contact area, inside | Near contact area, inside and outside |

TABLE 7

| Corner inside, Notch inside | A (FIG. 8) | B (FIG. 8) | C (FIG. 8) | D (FIG. 8) | E (FIG. 8) |
|---|---|---|---|---|---|
| Dimensions according to notch structure | A | D | E | B | C |
| Corner angle | 45° | 45° | 45° | 45° | 45° |

TABLE 8

| Type | Reference F (FIG. 10) | Notch F (FIG. 10) | S-Structure F (FIG. 10) | Corner F (FIG. 10) |
|---|---|---|---|---|
| Columns | 6 | 6 | 6 | 6 |
| Diameter of Backing Layer 1 [μm] | 1000 | 1000 | 1000 | 1000 |
| Thickness of Backing Layer 1 [μm] | 100 | 100 | 100 | 100 |
| Diameter of Backing Layer 2 [μm] | 500 | 500 | 500 | 500 |
| Thickness of Backing Layer 2 [μm] | 50 | 50 | 50 | 50 |
| Height of column [μm] | 400 | 400 | 400 | 400 |
| Diameter of column [μm] | 100 | 100 | 100 | 100 |
| Diameter of caps [μm] | — | — | — | — |
| Feature | — | Notch at upper ⅓ near to contact area; notch radius: 15 μm | S shape | Corner angle 45° |

TABLE 9

| | Corner F | Corner G | Corner H | Corner I | Corner J | Corner K | Corner L |
|---|---|---|---|---|---|---|---|
| e [μm] | 35 | 35 | 35 | 35 | 25 | 45 | 55 |
| φ [°] | 45 | 15 | 30 | 60 | 45 | 45 | 45 |

TABLE 10

| Structure | Reference A | Reference B | Reference C | Reference D | Reference E |
|---|---|---|---|---|---|
| Behavior | Outside or entire | Outside or entire | Outside or entire | Outside or entire | Buckles inward |
| Structure | Notch A | Notch B | Notch C | Notch D | Notch E |
| Behavior | Outside | Outside | Outside | Outside | Outside |
| Structure | Slot A | Slot B | Slot C | Slot D | Slot E |
| Behavior | Outside | Outside | Outside | Inside | Outside |
| Structure | Corner inside, notch inside A | Corner inside, notch inside B | Corner inside, notch inside C | Corner inside, notch inside D | Corner inside, notch inside E |
| Behavior | Inside | Inside | Inside | Outside | Outside |

The invention claimed is:

1. A shaped body having a structured surface whose structuring comprises a multiplicity of pillars each having at least one stem and at least one end face pointing away from the surface and at least one pillar comprises at least one structural feature,
   wherein the at least one structural feature is configured so that subsequent deformation leads to directed deformation on loading of the at least one pillar,
   wherein the at least one structural feature is a flexion.

2. The shaped body as claimed in claim 1, wherein the structural features are arranged on the individual pillars such that the lateral forces of the deformation cancel one another out.

3. The shaped body as claimed in claim 1, wherein the stem of each pillar has an aspect ratio of height to diameter of 2 to 15.

4. The shaped body as claimed in claim 1, wherein the at least one structural feature is located at a height 10% to 90% of a perpendicular height of the at least one pillar.

5. The shaped body as claimed in claim 1, wherein at least one pillar has a slot on a stem and has an angle of 10° to 40°.

6. The shaped body as claimed in claim 1, wherein the stem of the at least one pillar, in a region of 20% to 80% of the height of the at least one pillar, exhibits an increasing and a decreasing displacement toward one side.

7. The shaped body as claimed in claim 1, wherein there is no change in the shape of a cross section of the at least one pillar in a region of the flexion.

8. The shaped body as claimed in claim 1, wherein the multiplicity of pillars comprise epoxy-based elastomers, polyurethane (meth)acrylates, polyurethanes, silicones, silicone resins, or rubber.

9. The shaped body as claimed in claim 1, wherein the multiplicity of pillars comprises 3 to 50 pillars.

10. The shaped body as claimed in claim 1, wherein all of the pillars have the same height.

11. The shaped body as claimed in claim 1, wherein each of the pillars has a single flexion.

12. The shaped body as claimed in claim 1, wherein pillars are arranged in a circle and are configured so that a buckling direction is radially outward with respect to the circle.

13. A shaped body, comprising:
   a structured surface comprising a multiplicity of pillars, each pillar having at least one stem and at least one end face pointing away from the surface,
   wherein, prior to buckling, at least one pillar comprises a flexion.

* * * * *